(12) United States Patent
Choi

(10) Patent No.: US 11,756,314 B2
(45) Date of Patent: Sep. 12, 2023

(54) PROCESSORS CONFIGURED TO DETECT OBJECTS AND METHODS OF DETECTING OBJECTS

(71) Applicant: Samsung Electronics Co., Ltd., Suwon-si (KR)

(72) Inventor: Jinhyuk Choi, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 512 days.

(21) Appl. No.: 17/039,259

(22) Filed: Sep. 30, 2020

(65) Prior Publication Data

US 2021/0279482 A1    Sep. 9, 2021

(30) Foreign Application Priority Data

Mar. 5, 2020 (KR) .................. 10-2020-0027976

(51) Int. Cl.
*G06V 20/56* (2022.01)
*B60W 30/09* (2012.01)
(Continued)

(52) U.S. Cl.
CPC .......... *G06V 20/588* (2022.01); *B60W 10/20* (2013.01); *B60W 30/09* (2013.01); *B60W 30/0956* (2013.01); *B60W 40/105* (2013.01); *G06F 18/21* (2023.01); *G06F 18/22* (2023.01); *G06N 3/04* (2013.01); *G06N 3/08* (2013.01); *G06V 10/764* (2022.01); *G06V 10/82* (2022.01); *G06V 20/58* (2022.01); *G06V 20/584* (2022.01);
(Continued)

(58) Field of Classification Search
CPC .... G06V 20/588; G06V 10/764; G06V 10/82; G06V 20/58; G06V 20/584; G06V 2201/08; B60W 10/20; B60W 30/09; B60W 30/0956; B60W 40/105; B60W 10/06; B60W 2420/42; B60W 2510/0638; B60W 2520/10; B60W 2520/28; B60W 2540/18; B60W 2552/53; G06F 18/21; G06F 18/22; G06N 3/04
See application file for complete search history.

(56) References Cited

U.S. PATENT DOCUMENTS 7,688,999 B2    3/2010  Kim et al.
8,605,946 B2    12/2013 Iwasaki et al.
(Continued)

FOREIGN PATENT DOCUMENTS

JP    2007-317128 A    12/2007
JP    5395373 B2       1/2014
(Continued)

*Primary Examiner* — Solomon G Bezuayehu
(74) *Attorney, Agent, or Firm* — Harness, Dickey & Pierce, P.L.C.

(57) ABSTRACT

An electronic device, to detect an object, may continuously obtain a driving image and convert the driving image into a top-view image, generate a change value including a horizontal change value based on a steering angle and a vertical change value based on a vehicle speed, compensate the top-view image based on a plurality of lanes to generate first data and compensate the first data based on the change value to generate second data, generate third data based on performing a subtraction operation on a first frame and a second frame of the second data, and a group the third data and extract a grouped object.

19 Claims, 16 Drawing Sheets

(51) Int. Cl.

| | |
|---|---|
| *B60W 30/095* | (2012.01) |
| *B60W 10/20* | (2006.01) |
| *B60W 40/105* | (2012.01) |
| *G06N 3/04* | (2023.01) |
| *G06N 3/08* | (2023.01) |
| *G06V 20/58* | (2022.01) |
| *G06F 18/21* | (2023.01) |
| *G06F 18/22* | (2023.01) |
| *G06V 10/764* | (2022.01) |
| *G06V 10/82* | (2022.01) |
| *B60W 10/06* | (2006.01) |

(52) U.S. Cl.
CPC ......... *B60W 10/06* (2013.01); *B60W 2420/42* (2013.01); *B60W 2510/0638* (2013.01); *B60W 2520/10* (2013.01); *B60W 2520/28* (2013.01); *B60W 2540/18* (2013.01); *B60W 2552/53* (2020.02)

(56) References Cited

U.S. PATENT DOCUMENTS

| | | | |
|---|---|---|---|
| 2008/0205706 A1* | 8/2008 | Hongo | B60R 1/00 382/104 |
| 2011/0025848 A1* | 2/2011 | Yumiba | B60R 1/00 348/148 |
| 2013/0070962 A1* | 3/2013 | Yankun | G06T 7/20 382/103 |
| 2015/0098622 A1* | 4/2015 | Ryu | B60R 1/00 382/104 |
| 2016/0332574 A1* | 11/2016 | Park | G06T 11/60 |
| 2019/0095722 A1* | 3/2019 | Kang | G08G 1/167 |
| 2019/0096085 A1* | 3/2019 | Ueda | G06V 20/588 |
| 2019/0251373 A1* | 8/2019 | Lee | G06T 7/50 |
| 2020/0074192 A1 | 3/2020 | Ogata et al. | |
| 2020/0293791 A1* | 9/2020 | Womack | G06V 20/41 |

FOREIGN PATENT DOCUMENTS

| | | |
|---|---|---|
| JP | 2018-092501 A | 6/2018 |
| KR | 10-0685134 B1 | 2/2007 |
| KR | 10-1573576 B1 | 12/2015 |
| KR | 10-2017-0039965 A | 4/2017 |

\* cited by examiner

US 11,756,314 B2

PROCESSORS CONFIGURED TO DETECT OBJECTS AND METHODS OF DETECTING OBJECTS

CROSS-REFERENCE TO RELATED APPLICATION

This application claims the benefit, under 35 U.S.C. § 119, of Korean Patent Application No. 10-2020-0027976, filed on Mar. 5, 2020, in the Korean Intellectual Property Office, the disclosure of which is incorporated herein in its entirety by reference.

BACKGROUND

The inventive concepts relate to methods of processing a driving image of a vehicle and controlling the driving (also referred to herein as the navigation) of the vehicle.

In recent years, the "smartization" (e.g., increased computational capability, processing capacity, etc.) of automobiles has progressed due to the convergence of electronic technology and the automobile industry. Thus, automobiles are surpassing simple mechanical devices and evolving into electronic devices capable of processing a large amount of computations. A method of detecting objects in a surrounding environment using a technique based on mechanical learning has lately been applied to a driving assistance technique or driving control technique of automobiles. The importance of detection of objects is increasing during the driving of vehicles.

SUMMARY

The inventive concepts provide a processor configured to compensate a driving image, detect objects, and verify the detected objects based on machine learning, and a method of detecting objects using the processor, to thereby provide increased reliability of the detected objects.

According to some example embodiments, an electronic device may include processing circuitry that is configured to continuously obtain a driving image and convert the driving image into a top-view image; generate a change value including a horizontal change value based on a steering angle and a vertical change value based on a vehicle speed; compensate the top-view image based on a plurality of lanes to generate first data and compensate the first data based on the change value to generate second data; generate third data based on performing a subtraction operation on a first frame of the second data and a second frame of the second data; and group the third data and extract a grouped object.

According to some example embodiments, a method of detecting an object may include converting a driving image of a vehicle into a top-view image, generating first data based on compensating the top-view image based on a plurality of lanes detected in the top-view image, generating second data based on compensating the first data based on a steering angle and a vehicle speed, and generating third data based on the first data and the second data.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Hereinafter, some example embodiments will be described in detail with reference to the accompanying drawings.

Figure 1:
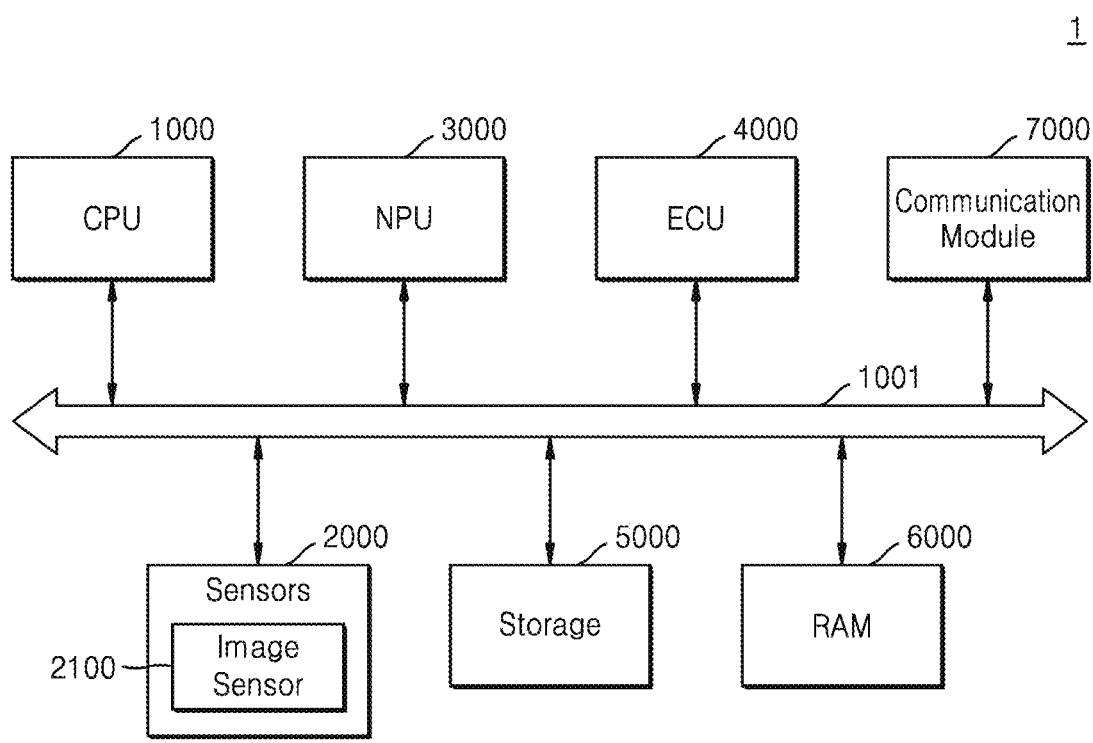
FIG. 1 is a block diagram of an electronic device configured to detect objects, according to some example embodiments.

FIG. 1 is a block diagram of an electronic device 1 configured to detect objects, according to some example embodiments.

Referring to FIG. 1, the electronic device 1 configured to detect objects, according to some example embodiments, may detect a lane in a driving image of at least a portion of an external (e.g., surrounding) environment obtained (e.g., generated) by one or more sensors 2000 and, based on the detection of the lane, obtain a steering angle and a vehicle speed from an electronic control unit (ECU) 4000. The electronic device 1 may convert the driving image, compensate the converted image based on the lane, the steering angle, and the vehicle speed, compare at least two frames of the compensated image, and detect the object. In some example embodiments, the electronic device 1 may compensate an image based on the lane, the steering angle and the vehicle speed and increase the accuracy of detection of objects. In some example embodiments, the electronic device 1 may detect the object from the driving image obtained by the sensors 2000 using a movement-based scheme and compare the object detected using the movement-based scheme with an object detected using a shape-based scheme by a neural processing unit (NPU) 3000 to which deep-learning technology is applied. As described herein, a neural processing unit (NPU) may be referred to interchangeably as neural processing circuitry.

Referring to FIG. 1, the electronic device 1 may include a central processing unit (CPU) 1000, the sensors 2000, the neural processing unit (NPU) 3000, the electronic control unit (ECU) 4000, a storage 5000, random access memory (RAM) 6000, a communication module 7000, and a bus 1001 through which the components of the electronic device 1 communicate with each other. The sensors 2000 may include an image sensor 2100. In some example embodiments, the electronic device 1 may further include an input/output (I/O) module, a security module, and a power control device and further include various kinds of control devices.

The CPU 1000 may control all operations of the electronic device 1. The CPU 1000 may include a single processor core (or a single core) or a plurality of processor cores (or a multi-core). The CPU 1000 may process or execute programs and/or data stored in the storage 5000. For example, the CPU 1000 may execute the programs stored in the storage 5000 and control functions of the NPU 3000 and the ECU 4000.

The sensors 2000 may obtain information about the objects. For example, the sensors 2000 may be adhered to the front of a vehicle or capture the driving image or measure a distance from an object located in front of the vehicle. Positions at which the sensors 2000 are adhered are not limited thereto, and the sensors 2000 may be adhered at various positions to the vehicle and obtain information about the objects as intended.

According to some example embodiments, the sensors 2000 may include the image sensor 2100. The image sensor 2100 may generate an image including the object and convert the image into image data (or an image frame). In some example embodiments, the sensors 2000 may sense a distance from the object. In this case, the sensors 2000 may include at least one distance sensor. The at least one distance sensor may include, for example, at least one of various kinds of sensing devices, such as a LIght Detection And Ranging (LIDAR) sensor, a RAdio Detection And Ranging (RADAR) sensor, a Time of Flight (ToF) sensor, an ultrasonic sensor, and an infrared sensor. Moreover, the LIDAR sensor and the RADAR sensor may be classified according to an effective measuring distance. For example, LIDAR sensors may be classified into a long LIDAR sensor and a short LIDAR sensor, and RADAR sensors may be classified into a long RADAR sensor and a short RADAR sensor. However, the sensors 2000 according to the inventive concepts are not limited thereto, and the sensors 2000 may include at least one of a magnetic sensor, a position sensor (e.g. a global positioning system (GPS)), an acceleration sensor, a pressure sensor, a temperature/humidity sensor, a proximity sensor, and a gyroscope sensor. Functions of the respective sensors may be intuitively inferred from names thereof by one skilled in the art, and thus, a detailed description thereof will be omitted.

The image sensor 2100 may be mounted in electronic equipment or an electronic device, which has an image sensor function or an optical sensing function. For example, the image sensor 2100 may be mounted in an electronic device, such as a camera, a smartphone, a wearable device, an Internet of Things (IoT) device, a tablet personal computer (PC), a personal digital assistant (PDA), a portable multimedia player (PMP), a navigation, a drone, and an advanced drivers assistance system (ADAS). In some example embodiments, the image sensor 2100 may be mounted on electronic equipment provided as a component in vehicles, furniture, manufacturing equipment, doors, and various pieces of measuring equipment. The image sensor 2100 may be a complementary metal-oxide-semiconductor (CMOS) image sensor.

The NPU 3000 may receive input data, perform an operation using an artificial neural network, and provide output data based on a result of the operation. The NPU 3000 may be a processor optimized for simultaneous matrix operations. The NPU 3000 may perform a plurality of operations in real-time, perform self-learning based on accumulated data, and derive an optical value. In some example embodiments, the NPU 3000 may be a specialized processor for performing (e.g., configured to perform) a deep-learning algorithm. For example, the NPU 3000 may perform an operation based on various kinds of networks, a convolution neural network (CNN), a region with convolution neural network (R-CNN), a region proposal network (RPN), a recurrent neural network (RNN), a fully convolutional network, a long short-term memory (LSTM) network, and a classification network. However, the inventive concepts are not limited thereto, and the NPU 3000 may perform various operations that simulate human neural networks.

A neural network, including an artificial neural network, may include various neural network systems and/or machine learning systems, e.g., an artificial neural network (ANN) system, a convolutional neural network (CNN) system, a deep neural network (DNN) system, a deep learning system, or the like. Such machine learning systems may include a variety of learning models, such as convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM). Alternatively or additionally, such machine learning systems may include other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests. Such machine learning models may also be used to provide for example, at least one of various services and/or applications, e.g., an image classify service, an advanced driver assistance system (ADAS) service, or the like, and may be performed, executed, implemented, processed, or the like by some or all of any of the systems and/or devices described herein, including some or all of the electronic device 1 (e.g., CPU 1000, NPU 3000, etc.).

Such models may be implemented with software or hardware and be a model based on at least one of an artificial neural network (ANN) model, a multi-layer perceptrons (MLPs) model, a convolutional neural network (CNN) model, a deconvolutional neural network, a decision tree model, a random forest model, an Adaboost (adaptive boosting) model, a multiple regression analysis model, a logistic regression model, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM). Alternatively or additionally, such models may include other forms of artificial intelligence models, such as, for example, linear and/or logistic regression, statistical clustering, Bayesian classification, decision trees, dimensionality reduction such as principal component analysis, and expert systems a random sample consensus (RANSAC) model; and/or combinations thereof. Examples of such models are not limited thereto.

The storage 5000, which is a storage site for storing data, may store an operating system (OS), various programs, and various pieces of data. In some example embodiments, the storage 5000 may be a storage space in which data processed by the CPU 1000, the NPU 3000, and the ECU 4000 is stored. The storage 5000 may include at least one of a volatile memory or a non-volatile memory. For instance, the non-volatile memory may include read-only memory (ROM), flash memory, phase-change RAM (PRAM), magnetic RAM (MRAM), resistive RAM (RRAM), and/or ferroelectric RAM (FRAM), and the volatile memory may include static RAM (SRAM) and/or dynamic RAM (DRAM), but the inventive concepts are not limited thereto. In some example embodiments, the storage 5000 may include a hard disk drive (HDD) and a solid-state drive (SSD).

The ECU 4000 may be an electronic control device provided to completely or partially control an operation of the vehicle. The ECU 4000 may control an operation of a combustion engine and an operation of at least one electric motor through a controller area network (CAN) multiplexing bus. In some example embodiments, the ECU 4000 may control an operation of the vehicle based on parameters of the vehicle according to the control of a semi-automatic gearbox (SAGB) or an automatic gearbox (AGB) and other drivers.

The ECU 4000 may electronically control an engine of the vehicle, an actuator of a steering control device, a transmission control system, an anti-lock brake system, an airbag control system with a computer. In some example embodiments, the ECU 4000 may provide the vehicle speed to the electronic device 1 based on an engine rotation speed or a wheel speed measured by a wheel sensor and provide the steering angle of the vehicle from the steering control device to the electronic device 1.

Although the ECU 4000 is illustrated as being provided in the vehicle separately from the CPU 1000, the inventive concepts are not limited thereto, and a vehicle control function of the ECU 4000 may be included in the CPU 1000 and performed together by the CPU 1000. In this case, the CPU 1000 may be interpreted as including at least two processor cores (or a Multi-core).

The RAM 6000 may temporarily store programs, data, or instructions. For example, the programs and/or the data stored in the storage 5000 may be temporarily stored in the RAM 6000 according to control or booting code of the CPU 1000. For example, the RAM 6000 may include dynamic RAM (DRAM), static RAM (SRAM), and/or synchronous DRAM (SDRAM).

The communication module 7000 may transmit data to the outside of the electronic device 1 or receive data from the outside. For example, the communication module 7000 may communicate with an external object of the electronic device 1. In this case, the communication module 7000 may perform communication operations using a Vehicle to EverYthing (V2X) scheme. For example, the communication module 7000 may perform communication operations using a Vehicle to Vehicle (V2V) scheme, a Vehicle to Infra (V2I) scheme, a Vehicle to Pedestrian (V2P) scheme, and a Vehicle to Nomadic Devices (V2N) scheme. However, the inventive concepts are not limited thereto, and the communication module 7000 may transmit and receive data using various known communication schemes. For example, the communication module 7000 may perform communications by a communication method using $3^{rd}$ generation (3G), long-term evolution (LTE), $5^{th}$-generation (5G), wireless-fidelity (Wi-Fi), Bluetooth, Bluetooth low energy (BLE), Zigbee, near-field communication (NFC), and/or ultrasonic waves and include both NFC and remote communication.

The bus 1001 may be a data transmission path through which processors (e.g., the CPU 1000, the NPU 3000, and the ECU 4000), the sensors 2000, the storage 5000, the RAM 6000, and the communication module 7000 may transmit and receive data to and from each other. In some example embodiments, at least two of the CPU 1000, the NPU 3000, the ECU 4000, the sensors 2000, the storage 5000, the RAM 6000, and the communication module 7000 may directly communicate with each other.

Because a method of detecting an object using deep-learning technology is applied to a driving assistance technique of automobiles, a technique of verifying whether an OOI is accurately extracted from objects detected by an image sensor through deep-learning technology and increasing extraction reliability may be required. The electronic device 1 configured to detect the objects, according to some example embodiments, may compensate the image based on the lane, which is obtained from the driving image captured by the image sensor 2100 of the sensors 2000, and the steering angle and the vehicle speed, which are obtained by the ECU 4000. Thus, it may be verified whether the OOI is accurately extracted, and the accuracy of detection of the objects may be increased. Furthermore, the electronic device 1 according to some example embodiments may increase the reliability of the detecting the object by comparing the object detected using the movement-based scheme with the object detected using the shape-based scheme by the NPU 3000 to which deep-learning technology is applied.

Although FIG. 1 illustrates the ECU 4000 as a component provided separately from the CPU 1000, the inventive concepts are not limited thereto, and the ECU 4000 may be provided in the CPU 1000.

The electronic device 1, and/or any portions thereof (including, without limitation, CPU 1000, NPU 3000, ECU 4000, etc.) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device, for example a solid state drive (SSD), storing a program of instructions, and a processor configured to execute the program of instructions to implement the functionality and/or methods performed by some or all of the electronic device 1, including the functionality and/or methods performed by some or all of CPU 1000, NPU 3000, and/or ECU 4000.

Figure 2:
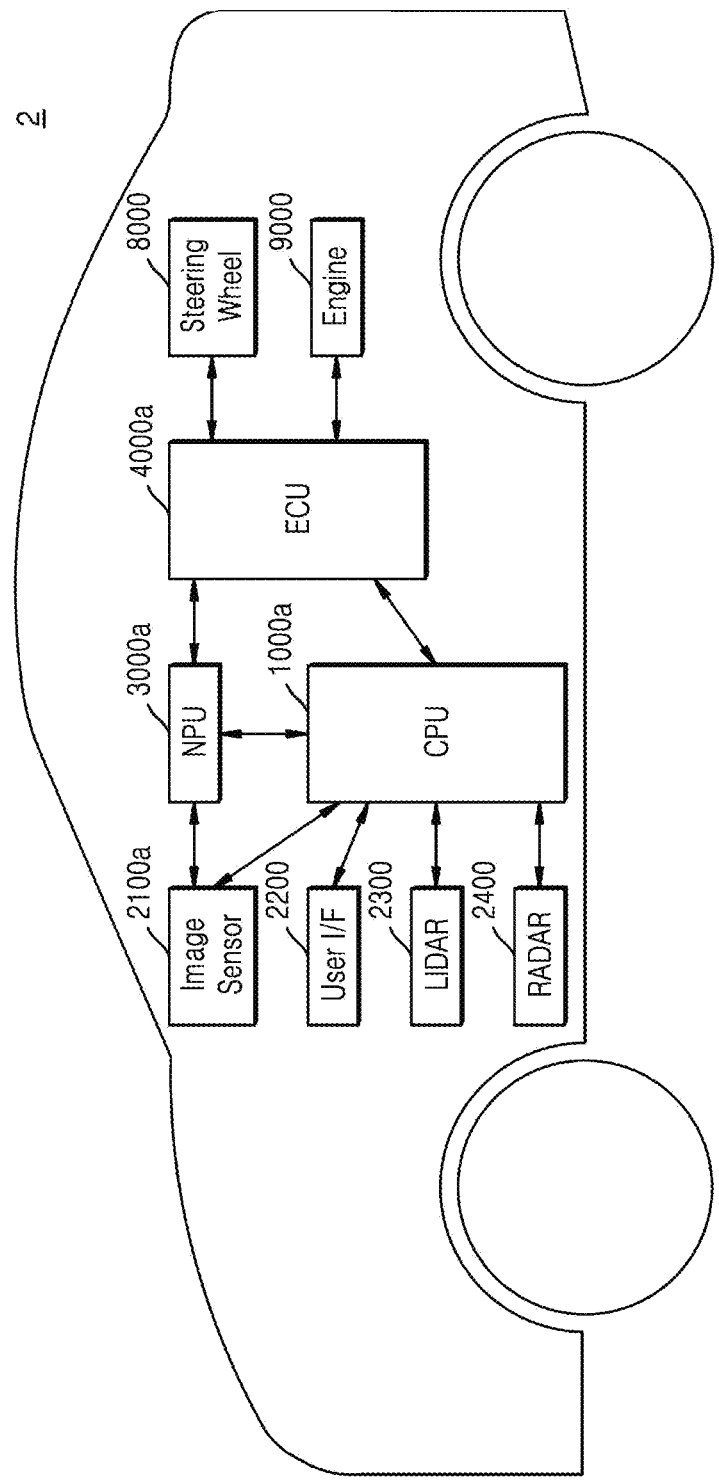
FIG. 2 is a diagram of a vehicle configured to detect objects, according to some example embodiments.

FIG. 2 is a diagram of a vehicle 2 configured to detect objects, according to some example embodiments.

Referring to FIG. 2, the vehicle 2 may include a CPU 1000a, an image sensor 2100a, a user interface 2200, a LIght Detection And Ranging (LIDAR) sensor 2300, a RAdio Detection And Ranging (RADAR) sensor 2400, an NPU 3000a, and an ECU 4000a. The ECU 4000a may receive a steering angle and a speed of the vehicle 2 from a steering wheel 8000 and an engine 9000. The steering angle may be measured based on monitoring a movement of the steering wheel 8000. The vehicle speed may be measured based on at least one of a quantity of revolutions of an engine 9000, pedaling of a driver, or a wheel speed (e.g., angular speed) of a wheel of the vehicle 2 over a particular period of elapsed time. The same description of the CPU 1000a, the image sensor 2100a, the user interface 2200, the LIDAR sensor 2300, the RADAR sensor 2400, the NPU 3000a, and the ECU 4000a as in FIG. 1 will be omitted. In some example embodiments, an object may refer to a specific object sensed around the vehicle 2, for example, at the front, rear, and sides of the vehicle 2, and an OOI may refer to an object that may affect the driving of the vehicle 2.

According to some example embodiments, the vehicle 2 may detect the object based on information about external environments, which is obtained by the sensors (refer to 2000 in FIG. 1). The vehicle 2 may include sensors (e.g., 2000 of FIG. 1), which may include the image sensor 2100a, the LIDAR sensor 2300, and the RADAR sensor 2400. The sensors (e.g., 2000 of FIG. 1) may capture an image of the object, measure a distance from the object and transmit the distance to the processors (e.g., the CPU 1000a, the NPU 3000a, and the ECU 4000a). The CPU 1000a and the NPU 3000a may detect the object (e.g., another vehicle) based on the captured image and generate signals or instructions for controlling the ECU 4000a. In some example embodiments, the CPU 1000a may detect the object, based on depth information output by a distance sensor, such as the LIDAR sensor 2300 and the RADAR sensor 2400.

The vehicle 2 according to the inventive concepts may obtain a driving image by using the image sensor 2100a, convert the driving image into a top-view image, which is an image viewed from a top surface of the vehicle 2, compensate the top-view image based on a lane, a vehicle speed, and a steering angle, and detect an OOI. The OOI may be a nearby vehicle located around the vehicle 2. When the OOI is detected, it can be inferred that there is a variation in relative velocity of the vehicle 2 to the nearby vehicle. Accordingly, the processors (e.g., the CPU 1000a and the NPU 3000a) may maintain a constant distance from the nearby vehicle or perform a series of processing operations for performing an evasive maneuver when a distance between the vehicle 2 and the nearby vehicle is greater than or equal to a critical distance or when the nearby vehicle is a cut-in object. Accordingly, the driving of vehicle 2 may be enabled and/or may be improved (e.g., the vehicle may drive along a particular trajectory through the surrounding environment according to a predetermined driving plan with improved avoidance of objects in the surrounding environments, including nearby vehicles) based on detection of one or more objects (e.g., OOI) in the surrounding environment based on implementing some or all of any functions of any portions of any electronic devices (e.g., vehicle 2) according to some example embodiments of the inventive concepts.

The image sensor 2100a may capture images of a surrounding environment of the vehicle 2. The vehicle 2 may include at least two image sensors to capture the images of the surrounding environment of the vehicle 2 in all directions at 360 degrees. In some example embodiments, the image sensor 2100a may include a wide-angle lens. In some example embodiments, the vehicle 2 may include four image sensors provided on a front surface, a rear surface, a left side surface, and a right side surface of the vehicle 2. However, the inventive concepts are not limited thereto, and images of the surrounding environment of the vehicle 2 may be captured by using a single image sensor 2100a. The image sensor 2100a may continuously capture the images of the surrounding environment of the vehicle 2 and continuously provide information about the surrounding environment of the vehicle 2 to the vehicle 2.

An image sensed by the image sensor 2100a may be processed by the CPU 1000a and/or the NPU 3000a. The CPU 1000a may process the sensed image using a movement-based scheme and detect an object, and the NPU 3000a may process the sensed image using a shape-based scheme and detect an object.

In some example embodiments, NPU 3000a sets at least one region of interest (ROI) in the input image. The ROI includes at least one of a portion of a region of the input image or at least one object included in the input image. An object may include, for example, a vehicle other than vehicle that is being driven, a road vanishing point, a road marking, a pedestrian, a vehicle, a traffic light, a lane marking, a traffic sign, a human, an animal, a plant, and a building, but the object is not limited thereto. In an example, the portion of region in the input image may be a region including at least one object. In another example, the portion of region in the input image may be a separate portion of region not including an object and may include, for example, a road boundary portion.

In an example, NPU 3000a may detect the object of interest from the restoration image using, for example, a convolution neural network (CNN), a deep neural network (DNN), and a support vector machine that are pre-trained to recognize objects of interest such as a road marking and a vehicle. The CNN may learn, in advance, a human, a vehicle, and a road marking such as a lane marking and a crosswalk marking of various road surface images, and may be associated with a region-based CNN. The CNN may learn, in advance, types of a lane marking and a non-lane marking to be detected and bounding boxes of the lane marking and the non-lane marking to be detected from the input image.

Similar to the above-described object, the object of interest may include, for example, a vehicle other than the vehicle that is being driven, a road vanishing point, a road marking, a pedestrian, a vehicle, a traffic light, a lane marking, a traffic sign, a human, an animal, a plant, and a building, but the object of interest is not limited thereto. The object of interest may be robustly detected in various situations by using neural networks that learn lane markings and/or non-lane markings of various road surface images. In addition, an identifying apparatus may detect the object of interest based on various machine learning methods.

In some example embodiments, NPU 3000a may calculate a reliability score of at least one object included in an input image. NPU 3000a may set bounding boxes for one or more objects included in the input image through bounding box detection based on deep learning or image processing, and calculate the reliability score of at least one object included in the bounding boxes. A "reliability score" may be understood as a reliability of detection or a probability that an object is detected from a bounding box.

In some example embodiments, NPU 3000a may set a region of interest (ROI) based on the reliability score. In an example, NPU 3000a may set a region of a bounding box as the ROI based on whether the reliability score corresponds to a threshold value. In an example, the detecting apparatus sets, as an ROI, a region of a bounding box corresponding to an object of which a reliability score is less than a threshold value or an object of which a reliability score corresponds to a section.

The threshold value may vary depending on a type (vehicle, human, traffic light, and traffic sign) of an object included in a bounding box or a class of an object.

The image sensor 2100a may be adhered to the front surface of the vehicle 2 and sense an external environment in front of the vehicle 2. However, the inventive concepts are not limited thereto, and the image sensor 2100a may be adhered to various surfaces of the vehicle 2 and sense the external environment.

The LIDAR sensor 2300 may emit a laser pulse, receive laser reflected by a target object again, and measure a distance from the target object. The LIDAR sensor 2300 may typically include a laser, a scanner, a receiver, and a positioning system. Light having a wavelength range of about 600 nanometers (nm) to about 1000 nm may be generally used for the laser, but the laser may adopt a different light wavelength range according to purposes. The scanner may scan a sensed surrounding environment and rapidly obtain information about the surrounding environment. Various types of scanners using a plurality of mirrors may be adopted. The receiver may receive a laser pulse reflected by a target object and detect photons in the laser pulse and amplify the photons. The positioning system may check position coordinates and a direction of a device including a receiver to embody a three-dimensional (3D) image.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

The RADAR sensor 2400 may emit electromagnetic waves (EMWs), receive EMWs, which are reflected back from a target object, again, measure a distance from the target object, identify the target object, or measure a position and movement speed of the target object. The RADAR sensor 2400 may include a transmission unit and a receiving unit. The transmission unit may generate and output the EMWs, and the receiving unit may receive reflected waves reflected from the target object and process a signal. The RADAR sensor 2400 may perform transmission and receiving functions through one antenna, but the inventive concepts are not limited thereto. Although a frequency band of EMWs used for the RADAR sensor 2400 is a radio wave band or a microwave band, the frequency band of the EMWs may be changed according to purposes. In some example embodiments, the LIDAR sensor 2300 and the RADAR sensor 2400 may be adhered to the vehicle 2 to assist the determination of a relative positional relationship between the vehicle and the OOI. In some example embodiments, unlike as shown in FIG. 2, the LIDAR sensor 2300 and the RADAR sensor 2400 may be omitted.

The user interface 2200 may include various electronic devices and mechanical devices (e.g., a dashboard of a vehicle, a display indicating driving information, a navigation device, and an air conditioner), which are included in a driver's seat or a front passenger seat.

The CPU 1000a may continuously obtain the driving image from the image sensor 2100a for each frame, post-process the driving image, and detect the object. The CPU 1000a may convert the driving image into the top-view image (e.g., a road and vehicles viewed from the sky), which is viewed from top of the vehicle 2.

The CPU 1000a may detect a plurality of lanes in the top-view image and perform a lane compensation operation for compensating the respective lanes to be parallel to each other. By performing the lane compensation operation such that the respective lanes are parallel to each other, a bottom surface, which is a point of contact between a vehicle body and a road surface, may be determined to be flat in all of a plurality of frames of the top-view image. In some example embodiments, due to the lane compensation operation, vibrations and the shaking of a vehicle body, which occur due to contact of the vehicle 2 with the road surface, may be removed from the top-view image.

The CPU 1000a may obtain a steering angle and a vehicle speed from the ECU 4000a. The steering angle may be determined by the manipulation of the steering wheel 8000 by a driver. The steering angle may be processed by the ECU 4000a, which controls an operation of a steering control device, and provided to the CPU 1000a. The vehicle speed may be measured based on at least one of the driver's pedaling (e.g., an operation of an accelerator), a rotation speed of the engine 9000, or a wheel speed measured by a wheel sensor. The vehicle speed may be processed by the ECU 4000a, which controls the vehicle speed, and provided to the CPU 1000a. The CPU 1000a may remove a movement element of the vehicle 2 from the top-view image based on the current speed and steering angle of the vehicle 2. In some example embodiments, vertical and horizontal movement elements of the top-view image may be removed to remove a fluctuation in the driving image, which is caused by the driving of the vehicle 2. Thus, only a relative movement element between the vehicle 2 and the nearby vehicle may be left. In addition, the CPU 1000a may determine a relative positional relationship between the vehicle 2 and the nearby vehicle, and generate an instruction to maintain the number of revolutions of the engine 9000 so that the vehicle 2 may be driven at a constant speed to maintain a constant distance from the nearby vehicle according to a predetermined driving plan. When a distance between the vehicle 2 and the nearby vehicle is less than or equal to a critical distance or when the nearby vehicle is a cut-in object, the CPU 1000a may generate an instruction to adjust the steering wheel 8000 left or right and change the steering angle to cause the vehicle 2 to perform an evasive maneuver. Accordingly, the driving of vehicle 2 may be enabled and/or may be improved (e.g., the vehicle may drive along a particular trajectory through the surrounding environment according to a predetermined driving plan with improved avoidance of objects in the surrounding environments, including nearby vehicles) based on detection of one or more objects (e.g., OOI) in the surrounding environment based on implementing some or all of any functions of any portions of any electronic devices (e.g., vehicle 2) according to some example embodiments of the inventive concepts. Although the steering wheel 8000 and the engine 9000 illustrated in FIG. 2 are disclosed as components related to the steering angle and the vertical speed, the inventive concepts are not limited thereto, and the steering angle and the vehicle speed may be determined by using various components of the vehicle 2.

The CPU 1000a may detect an object using the movement-based scheme from the driving image. The movement-based scheme may be a method of determining a relative movement by detecting a degree of movement of an object over time. The driving image may be continuously obtained for each frame by using the image sensor 2100a. For example, an image of each frame may be captured at a speed of about 60 frame per second (fps), and thus, the CPU 1000a may detect movement between image frames, which is acquired every 1/60 second, over time. The movement-based scheme may include optical flow, which indicates a distribution of movement vectors of the object.

In addition to the image sensor 2100a, the CPU 1000a may stably maintain a driving state of the vehicle 2 by assistively using the distance from the object, which is obtained from the LIDAR sensor 2300 and the RADAR sensor 2400. In some example embodiments, the CPU 1000a may generate an instruction to adjust inner and outer states of the vehicle 2 according to the manipulation of the user interface 2200 by a driver.

The NPU 3000a may be optimized for simultaneous matrix operations and perform a plurality of operations in real-time. In some example embodiments, the NPU 3000a may perform self-learning based on accumulated data and derive a local-maximum in the current driving parameter. In some example embodiments, the NPU 3000a may be a specialized processor for performing a deep-learning algorithm.

The NPU 3000a may receive a driving image from the image sensor 2100a and detect an object based on the driving image using a shape-based scheme. The NPU 3000a may extract features of a plurality of objects, perform self-learning based on the accumulated data, and distinguish the plurality of objects from each other in the driving image. For example, the NPU 3000a may extract objects (e.g., vehicles, pedestrians, traffic lights, and lanes), which are used as determination criteria during the driving of the vehicle 2, from a single driving image, based on features determined by using the accumulated data as learning materials.

According to the inventive concepts, the vehicle 2 including the CPU 1000a and the NPU 3000a may detect objects using the shape-based scheme and extract OOIs (e.g., vehicles, pedestrians, and lanes) from the driving image. The CPU 1000a may convert and compensate the driving image, perform an operation on different frames, and generate a difference count map related to the OOIs. The difference count map may be interpreted as an image indicating a difference between corresponding pixels from among pixels included in two images generated at different points in time. In some example embodiments, a variation in the image over time may be detected by using the difference count map.

The NPU 3000a may extract the OOI from a plurality of objects included in a driving image, based on a deep-learning scheme (e.g., a deep-learning algorithm). The vehicle 2 may compare an OOI extracted by (e.g., provided from) the NPU 3000a with the difference count map generated by the CPU 1000a and ascertain whether the OOI is included in the difference count map. When the OOI extracted by the NPU 3000a is not included in the difference count map, the vehicle 2 may register the OOI as a removal candidate to be removed from a list of OOIs. In some example embodiments, when a region corresponding to a region of the difference count map is not included in the OOI extracted by the NPU 3000a, the vehicle 2 may register the region of the difference count map, which corresponds to the region without the OOI, as a new OOI to be added to a list of additional candidates. In other words, the CPU 1000a may verify the object detected by the NPU 3000a and increase the accuracy of detection of the objects.

The ECU 4000a may adjust states of the steering wheel 8000 and the engine 9000 based on instructions generated by the CPU 1000a and the NPU 3000a. In some example embodiments, the ECU 4000a may accelerate or decelerate the vehicle 2 in response to the instructions generated by the CPU 1000a and the NPU 3000a, and provide a signal for increasing or reducing an engine rotation speed to the engine 9000 so as to accelerate/decelerate the vehicle 2. Furthermore, when a distance between the vehicle 2 and the nearby vehicle is less than or equal to a critical distance according to a predetermined driving plan or when the nearby vehicle is a cut-in object, the ECU 4000a may turn the steering wheel 8000 left or right to perform an evasive maneuver. Accordingly, the driving of vehicle 2 may be enabled and/or may be improved (e.g., the vehicle may drive along a particular trajectory through the surrounding environment according to a predetermined driving plan with improved avoidance of objects in the surrounding environments, including nearby vehicles) based on detection of one or more objects (e.g., OOI) in the surrounding environment based on implementing some or all of any functions of any portions of any electronic devices (e.g., vehicle 2) according to some example embodiments of the inventive concepts.

In some example embodiments, unlike that shown in FIG. 2, the ECU 4000a may be provided in the CPU 1000a. In some example embodiments, the CPU 1000a may include functions of the ECU 4000a and collectively control operations of the vehicle 2. The CPU 1000a may include at least two processor cores (e.g., a multi-core).

In some example embodiments, the vehicle 2 may be referred to as an electronic device. In some example embodiments, the vehicle 2, and/or any portions thereof (including, without limitation, CPU 1000a, NPU 3000a, ECU 4000a, etc.) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device, for example a solid state drive (SSD), storing a program of instructions, and a processor configured to execute the program of instructions to implement the functionality and/or methods performed by some or all of the vehicle 2, including the functionality and/or methods performed by some or all of CPU 1000a, NPU 3000a, and/or ECU 4000a.

Figure 3:
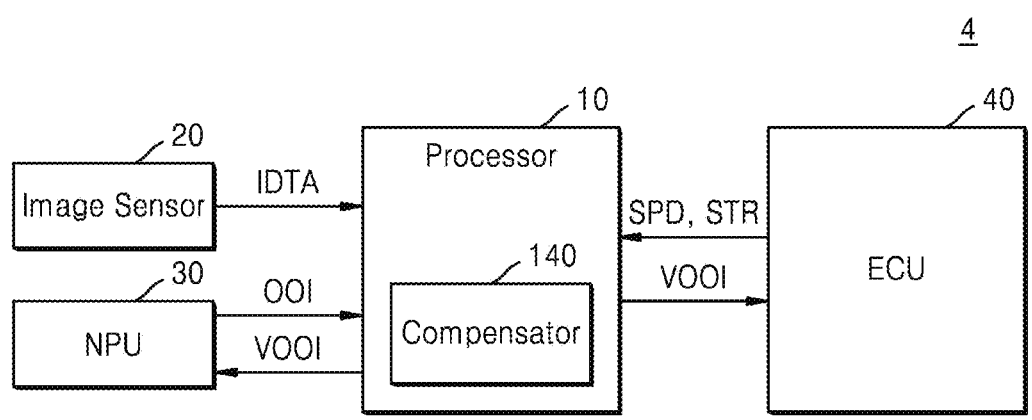
FIG. 3 is a block diagram of a processing device, which includes a processor configured to detect objects, an image sensor, a neural processing unit (NPU), and an electronic control device, according to some example embodiments.

FIG. 3 is a block diagram of a processing device 4, which includes a processor 10 configured to detect objects, an image sensor 20, an NPU 30, and an ECU 40, according to some example embodiments. FIG. 3 will be described with reference to FIGS. 1 and 2, and repeated descriptions thereof will be omitted.

Referring to FIG. 3, the processing device 4 may include the processor 10 configured to detect the objects, the image sensor 20, the NPU 30, and the ECU 40, and the processor 10 may include a compensator 140.

The object may be a specific object sensed around a vehicle, for example, at the front, rear, and sides of the vehicle, and an OOI may refer to an object that may affect the driving of the vehicle. For example, the object may be any object (e.g., a pedestrian, a road, a sign, a nearby vehicle, a traffic light, a lane, a street light, the sky, or the like) sensed by the image sensor 20, and the OOI may be a nearby vehicle, a pedestrian, or a lane, but the inventive concepts are not limited thereto. The OOI may be extracted in a Region of Interest (ROI), which is a range of image data, which is partitioned for the purpose of detecting an object on a screen. The NPU 30 may extract the OOI from a plurality of objects included in a driving image, based on a deep-learning scheme (e.g., a deep-learning algorithm).

The processor 10 may continuously receive a driving image IDTA for each frame from the image sensor 20 and receive an extracted OOI from the NPU 30. In some example embodiments, the processor 10 may receive a steering angle STR of the vehicle and a vehicle speed SPD from the ECU 40.

The processor 10 may post-process the driving image IDTA, detect the object, and verify a previously extracted OOI based on the detected object. In some example embodiments, the processor 10 may convert the driving image IDTA received from the image sensor 20 into a top-view image and directly detect a lane from a converted image or recognize the lane based on OOI information received from the NPU 30. The compensator 140 included in the processor 10 may perform a lane compensation operation for compensating respective lanes to be parallel to each other based on the driving image IDTA, and perform a movement compensation operation for removing movement elements of the vehicle based on the steering angle STR and the vehicle speed SPD. By performing the lane compensation operation and the movement compensation operation on the converted image, a compensated image may be an image from which vibrations caused by friction between a road surface and the vehicle and a variation caused by the movement of the vehicle are removed. Accordingly, the processor 10 may perform an operation on a frame of the compensated image, which is obtained at a point in time t and a frame of the compensated image, which is obtained at a point in time (t–1), and generate a difference count map based on the operation result to detect an object. In some example embodiments, the processor 10 may compare the detected object with a received OOI and generate a verification signal VOOI based on the comparison result.

The verification signal VOOI may be generated as a result of an operation of comparing the OOI received from the NPU 30 with the difference count map generated by the processor 10. In some example embodiments, when the OOI extracted by the NPU 30 is not included in the difference count map, the processor 10 may generate a verification signal VOOI indicating that the OOI is incorrectly extracted. In some example embodiments, when a region corresponding to a region of the difference count map is not included in the OOI, the processor 10 may generate a verification signal VOOI indicating that the region of the difference count map, which corresponds to the region without the OOI, is a new OOI. The NPU 30 may remove the OOI from a list of OOIs or add the OOI to the list of OOIs in response to the verification signal VOOI. In response to the verification signal VOOI, the ECU 40 may provide a signal for increasing or reducing the vehicle speed SPD to an engine or provide a signal for changing the steering angle STR to a steering wheel. To sum up, the processor 10 may determine a relative position relationship between the vehicle and the nearby vehicle and generate an instruction for maintaining a constant distance from the nearby vehicle or performing an evasive maneuver to the NPU 30 and the ECU 40 based on the determination result and according to a predetermined driving plan. Accordingly, the driving of a vehicle that includes the processing device 4 may be enabled and/or may be improved (e.g., the vehicle may drive along a particular trajectory through the surrounding environment according to a predetermined driving plan with improved avoidance of objects in the surrounding environments, including nearby vehicles) based on detection of one or more objects (e.g., OOI) in the surrounding environment based on implementing some or all of any functions of any portions of any electronic devices (e.g., processing device 4) according to some example embodiments of the inventive concepts.

In some example embodiments, the processor 10 may detect an object using a movement-based scheme. Thus, the processor 10 may detect a degree of movement of the object from the driving image IDTA over time and determine a relative movement. In some example embodiments, the processor 10 may determine a driving state of the vehicle based on utilizing a distance from the object, which is obtained from a LIDAR sensor (refer to 2300 in FIG. 2) and a RADAR sensor (refer to 2400 in FIG. 2). The processor 10 may be implemented as the CPU 1000 of FIG. 1 or the CPU 1000a of FIG. 2.

The processor 10 configured to detect the objects, according to some example embodiments, may compensate an image based on the lane, which is obtained from the driving image IDTA, and movement factor (e.g., the steering angle STR, and the vehicle speed SPD) of the vehicle and increase the accuracy of detection of the objects. In some example embodiments, the processor 10 may detect the object in the driving image IDTA using the movement-based scheme, compare the object detected using the movement-based scheme with an OOI detected using a shape-based scheme in an artificial neural network device to which deep-learning technology is applied, and increase the reliability of the detected object.

The image sensor 20 of FIG. 3 may correspond to the image sensor 2100 of FIG. 1 or the image sensor 2100 of FIG. 2, and the NPU 30 of FIG. 3 may correspond to the NPU 3000 of FIG. 1 or the NPU 3000a of FIG. 2, and thus, repeated descriptions thereof will be omitted.

The NPU 30 may process the driving image IDTA, which is sensed by the image sensor 20, using a shape-based scheme and extract the OOI from a plurality of objects. The NPU 30 may extract the OOI from a plurality of objects included in a driving image IDTA, based on applying deep-learning technology, e.g., a deep-learning scheme (e.g., a deep-learning algorithm).

As described herein, applying deep-learning technology, e.g., a deep-learning scheme (e.g., a deep-learning algorithm) to a driving image IDTA to extract the OOI from a plurality of objects included in a driving image IDTA may include applying one or more machine learning systems (e.g., a deep neural network, including an artificial neural network, may include various neural network systems and/or machine learning systems, e.g., an artificial neural network (ANN) system, a convolutional neural network (CNN) system, a deep neural network (DNN) system, a deep learning system, or the like), a variety of learning models (e.g., convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM)) or the like to the IDTA to extract the OOI. Alternatively or additionally, such application of deep-learning technology to the IDTA to extract the OOI may include applying, to the IDTA, other forms of machine learning models, such as, for example, linear and/or logistic regression, statistical clustering, Bayesian classification, decision trees, dimensionality reduction such as principal component analysis, and expert systems; and/or combinations thereof, including ensembles such as random forests. Such deep-learning technology (e.g., deep-learning scheme) applied to the IDTA to extract the OOI may be performed, executed, implemented, processed, or the like by some or all of any of the systems and/or devices described herein, including some or all of the electronic device 1 (e.g., NPU 30).

Such application of deep-learning technology (e.g., deep-learning scheme) to the IDTA to extract an OOI from a plurality of objects included in the IDTA may be implemented with software or hardware and include application of a model based on at least one of an artificial neural network (ANN) model, a multi-layer perceptrons (MLPs) model, a convolutional neural network (CNN) model, a deconvolutional neural network, a decision tree model, a random forest model, an Adaboost (adaptive boosting) model, a multiple regression analysis model, a logistic regression model, recurrent neural networks (RNN) optionally including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM). Alternatively or additionally, such models may include other forms of artificial intelligence models, such as, for example, linear and/or logistic regression, statistical clustering, Bayesian classification, decision trees, dimensionality reduction such as principal component analysis, and expert systems a random sample consensus (RANSAC) model; and/or combinations thereof. Examples of such models are not limited thereto.

In some example embodiments, the image sensor 20 may provide the driving image IDTA to the NPU 30. The NPU 30 may distinguish a plurality of objects from each other in the driving image IDTA based on deep-learning technology. According to the deep-learning technology, the NPU 30 may detect the plurality of objects in the driving image IDTA, extract features of the respective objects, and perform self-learning based on accumulated data. For example, the NPU 30 may extract objects (e.g., vehicles, pedestrians, lanes, and traffic lights), which are used as determination criteria during the driving of the vehicle, from a single driving image, and group the objects. In some example embodiments, the image sensor 20 and the NPU 30 may detect objects and provide an OOI required by the processing device 4, from among the objects.

Although the ECU 40 and the processor 10 are illustrated as independent components separated from each other in FIG. 3 for brevity, the processor 10 may perform functions of the ECU 40 as described above with reference to FIG. 2.

In some example embodiments, the processing device 4 may be referred to as an electronic device. In some example embodiments, the processing device 4, and/or any portions thereof (including, without limitation, processor 10, ECU 40, etc.) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device, for example a solid state drive (SSD), storing a program of instructions, and a processor configured to execute the program of instructions to implement the functionality and/or methods performed by some or all of the processing device 4, including the functionality and/or methods performed by some or all of processor 10 and/or ECU 40.

Figure 4:
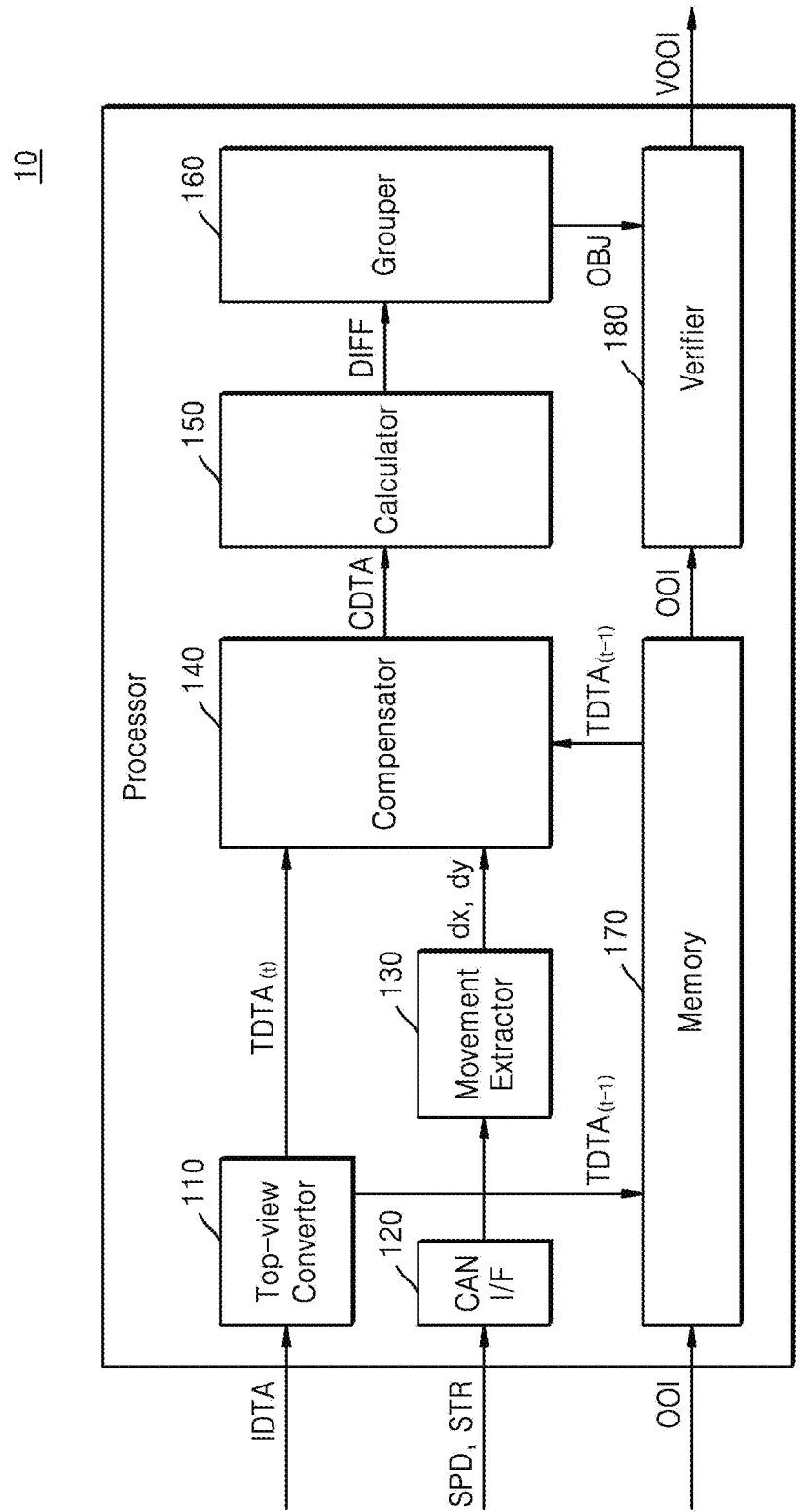
FIG. 4 is a detailed block diagram of a processor configured to detect objects, according to some example embodiments.

FIG. 4 is a detailed block diagram of a processor 10 configured to detect objects, according to some example embodiments. FIG. 4 will be described with reference to FIGS. 1 to 3, and repeated descriptions thereof will be omitted.

The processor 10 according to some example embodiments may include a top-view converter 110, a CAN interface 120, a movement extractor 130, a compensator 140, a calculator 150, a grouper 160, a memory 170, and a verifier 180. In some example embodiments, the components may include a hardware block designed by logic synthesis. In some example embodiments, the components may include a software block, which includes an instruction executed by a core and is stored in a memory. In some example embodiments, the components may include a combination of a hardware block and a software block.

The top-view converter 110 may receive a driving image IDTA and convert the driving image IDTA into a top-view image TDTA. The driving image IDTA may be continuously provided for each frame by the image sensor (refer to 20 in FIG. 3), and the top-view converter 110 may convert all frames of the driving image IDTA into the top-view image TDTA, which is viewed from a top surface of a vehicle. The top-view converter 110 may store a top-view image $TDTA_{(t-1)}$ of a frame, which is obtained at a converted point in time (t−1), in the memory 170. In some example embodiments, the top-view converter 110 may provide a top-view image $TDTA_{(t)}$ of a frame, which is obtained at a converted point in time t, to the compensator 140. In other words, all frames of the top-view image TDTA may be stored in the memory 170 and provided to the compensator 140.

The CAN interface 120 may be an interface to which a signal is transmitted through a CAN multiplexing bus. CAN communication may be a communication protocol designed for microcontrollers or devices to communicate with each other without a host computer in a vehicle. In the CAN communication, a plurality of controllers may be connected in parallel and transmit and receive information to and from each other. The CAN interface 120 may perform an interfacing operation by receiving a vehicle speed SPD and a steering angle STR from an ECU (refer to 30 in FIG. 4), and transmitting the vehicle speed SPD and the steering angle STR to the movement extractor 130 of the processor 10.

The movement extractor 130 may calculate a horizontal change value dy and a vertical change value dx based on the vehicle speed SPD and/or the steering angle STR, which are received from the CAN interface 120. In some example embodiments, the movement extractor 130 may receive the vehicle speed SPD and the steering angle STR and proportionally convert the vehicle speed SPD and the steering angle STR to correspond to a size and resolution of the top-view image TDTA from conversion by the top-view converter 110. For example, when the top-view image TDTA is 800 pixels wide by 600 pixels long, the vehicle speed SPD is 60 km/h, and the steering angle STR is 30 degrees, the movement extractor 130 may convert the horizontal change value dy into 20 pixels corresponding to the steering angle STR of 30 degrees and convert the vertical change value dx into 30 pixels corresponding to the vehicle speed SPD of 60 km/h. The horizontal change value dy and the vertical change value dx, which are values for removing movement elements of the vehicle, may be used for compensation operations of the compensator 140 to be described below. In some example embodiments, y may be interpreted as a horizontal direction of an image, and x may be interpreted as a vertical direction (or longitudinal direction) of the image. The present example is provided for brevity, and conversion ratios are not limited thereto and may vary depending on a processing method of the processor 10 and the size of the top-view image TDTA.

The compensator 140 may perform a lane compensation operation for compensating respective lanes to be parallel to each other based on the top-view image TDTA and perform a movement compensation operation for removing movement elements of the vehicle based on the horizontal change value dy and the vertical change value dx. The compensator 140 may generate a compensated image CDTA. By performing the lane compensation operation and the movement compensation operation on the top-view image TDTA, the compensated image CDTA may be an image from which vehicle shaking caused by friction between a road surface and the vehicle is removed. In some example embodiments, the compensated image CDTA may be an image from which a variation caused by the movement of the vehicle is removed.

The compensator 140 may load the top-view image TDTA from the memory 170. The compensator 140 may perform a movement compensation operation based on both the top-view image TDTA(t−1) loaded from the memory 170 and the top-view image TDTA$_{(t)}$ received from the top-view converter 110. A compensation method will be described below with reference to FIGS. 8 and 9.

The calculator 150 may receive the compensated image CDTA, perform an operation on frames of the compensated image CDTA, which are obtained at adjacent time points, and generate a difference image DIFF as an operation result. The difference image DIFF generated by the calculator 150 may be an image related to the detection of an object. For instance, assuming that the driving image IDTA is captured at a speed of about 60 fps, the difference image DIFF may be generated by compensating an image that is captured every 1/60 seconds. In other words, the difference image DIFF may be an image obtained by detecting a variation in image for 1/60 seconds. The generated difference image DIFF may be transmitted to the grouper 160.

The grouper 160 may group detected objects based on a change in image during a time period that is inversely proportional to a photographing speed and extract a grouped object OBJ. The grouper 160 may group pixel values (e.g., a plurality of data values) included in the difference image DIFF into at least one set according to a degree to which pixel values detected from the difference image DIFF are distributed, and the grouped pixel values may refer to a variation of the object. In some example embodiments, in the image, pixels located a short distance from each other or pixels that are determined to be similar or related to each other may be grouped. As a result, the grouped object OBJ may be extracted (e.g., generated) based on grouping a plurality of data values included in the difference image DIFF, also referred to herein as grouping the difference image DIFF.

The grouper 160 may use various clustering methods to group the detected objects. For example, the grouper 160 may group the detected pixel values (also referred to herein as grouping the difference image DIFF) by using various algorithms, such as K-means clustering, hierarchical clustering, K-medoids, and Clara, but the inventive concepts are not limited thereto.

According to some example embodiments of the inventive concepts, the processor 10 may extract a grouped object OBJ, which is a result classified as a set, from the difference image DIFF. The grouped object OBJ may indicate the movement of the object for a unit time (e.g., 1/60 second in inverse proportion to the capturing speed).

According to some example embodiments of the inventive concepts, the processor 10 removes the movement of the vehicle (e.g., 2 in FIG. 2) including the processor 10 from the movement of the surrounding vehicle, thereby changes per time can be measured more precisely.

Further, according to some example embodiments of the inventive concepts, the grouped object OBJ may be included in the difference value map. Accordingly, the clustered object OBJ may be removed from the object of interest OOI list or newly registered in the object of interest OOI list by comparing it with the object of interest OOI provided by the NPU (30 in FIG. 3). The grouped object OBJ (corresponding to the difference map) generated as a result of processing by the CPU 1000 can be used for verification of the object of interest by comparing it with the object of interest OOI generated as a result of processing by the NPU 30.

The memory 170 may store an OOI and a top-view image TDTA(t−1) from conversion, which is transmitted by the top-view converter 110, provide the top-view image TDTA (t), which is stored, to the compensator 140, and provide the OOI to the verifier 180.

The verifier 180 may compare an OOI, which is extracted by (e.g., provided from) an NPU, with an object grouped by the processor 10 (e.g., a grouped object 161 extracted from one or more difference images DIFF) and verify whether the OOI is accurately extracted, thereby verifying the OOI based on the grouped object (e.g., OBJ). In some example embodiments, the verifier 180 may compare an object detected using a movement-based scheme (e.g., a grouped object as described herein) with an OOI detected using a shape-based scheme and increase the reliability of the detected object. A comparator may generate a verification signal VOOI based on the verification result, where the verification signal VOOI may indicate whether the grouped object is included in the OOI. The verification signal VOOI may be transmitted to the neural processing unit (NPU) 30 and the NPU 30 may add the grouped object as a new OOI in response to a determination that the grouped object is not included in the OOI.

In some example embodiments, the processor 10 may be referred to as an electronic device. In some example embodiments, the processor 10, and/or any portions thereof may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device, for example a solid state drive (SSD), storing a program of instructions, and a processor configured to execute the program of instructions to implement the functionality and/or methods performed by some or all of the processor 10.

Figure 5:
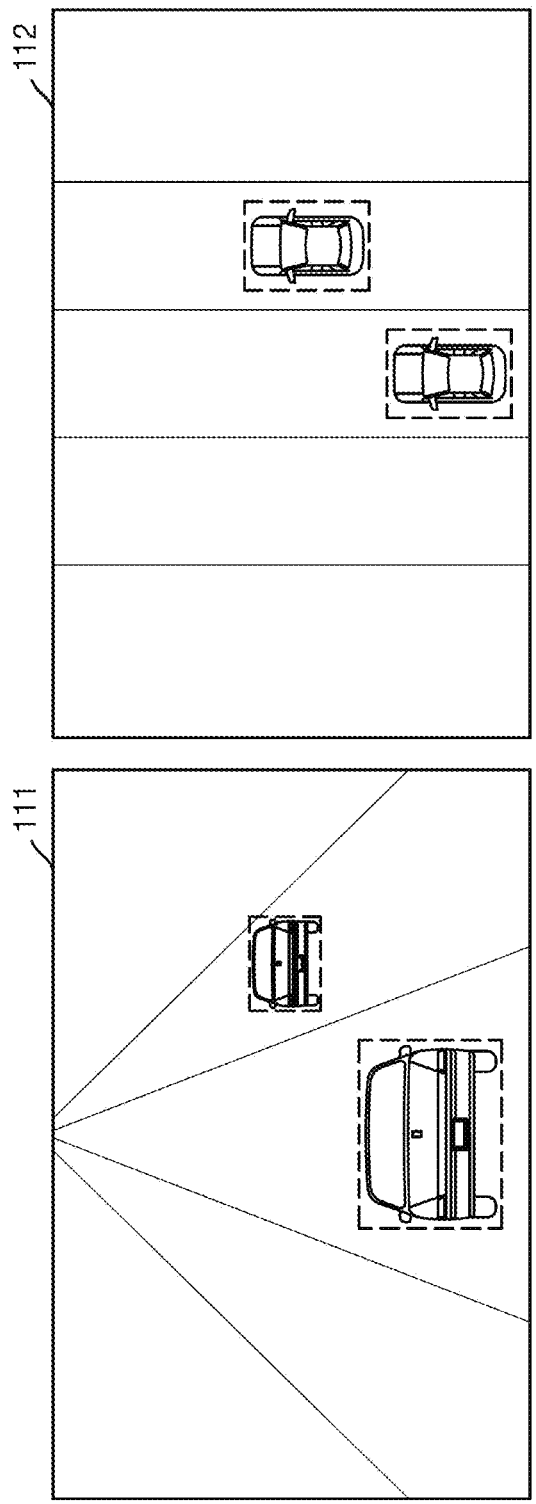
FIG. 5 is a diagram of a driving image illustrating an operation of a converter included in a processor, according to some example embodiments.

FIG. 5 is a diagram of a driving image illustrating an operation of a converter included in a processor, according to some example embodiments. Hereinafter, FIG. 5 will be described with reference to FIGS. 1, 2, and 4.

An image 111 may be a driving image IDTA sensed by an image sensor (refer to 2100a in FIG. 2). The image sensor 2100a may be adhered to the front of a vehicle and detect a lane and a nearby vehicle. Because the image 111 is a two-dimensional (2D) plane obtained by sensing a three-dimensional (3D) space, straight lanes may meet in the middle of the image 111 and form a road vanishing point. Thus, a near side may be seen as large, and a far side may be seen as small.

An image 112 may be a top-view image TDTA into which the driving image IDTA is converted. The top-view image TDTA may be an image viewed from top of the vehicle. The driving image IDTA may be converted by a converter (refer to 110 in FIG. 4) into the image 112, which is the top-view image TDTA.

The top-view converter 110 may perform homography transformation. The homography transformation may be performed by a homography matrix H, which defines a relationship between the image sensor 2100 and a bottom surface of the vehicle. The homography transformation may be performed using rigid transformation, similarity transformation, affine transformation, or projective transformation.

Figure 6:
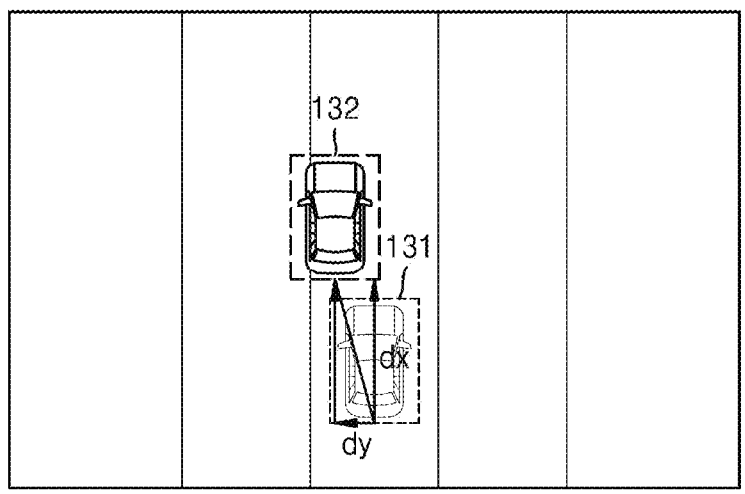
FIG. 6 is a diagram of a driving image illustrating an operation of a movement extractor included in a processor, according to some example embodiments.

FIG. 6 is a diagram of a driving image illustrating an operation of the movement extractor 130 included in a processor, according to some example embodiments. FIG. 6 will be described with reference to FIGS. 2 and 4.

The movement extractor 130 may receive a vehicle speed SPD and a steering angle STR from the CAN interface 120 and proportionally convert the vehicle speed SPD and the steering angle STR to correspond to a size and resolution of the top-view image TDTA from conversion by the top-view converter 110.

A vehicle 131 illustrated in FIG. 6 is expressed on a road as a vehicle including the processor 10 of FIG. 4. At a point in time (t−1), the vehicle 131 may be located in the center of an image from the viewpoint of the top-view image TDTA. Between points in time (t−1) and t, the vehicle 131 may be accelerated and a steering wheel may be turned left. As a result, a driving image sensed by an image sensor (refer to 2000 in FIG. 2) adhered to a front surface of the vehicle 131 may be converted into the top-view image TDTA by the top-view converter 110. At the point in time t, a vehicle 132 may be observed when the vehicle 131 obtained at the point in time (t−1) is moved by a horizontal change value dy leftward and is moved by a vertical change value dx upward. In some example embodiments, the movement extractor 130 may calculate the vertical change value dx and the horizontal change value dy corresponding to a size and resolution of the top-view image TDTA from the steering angle STR and the vehicle speed SPD.

Figure 7:
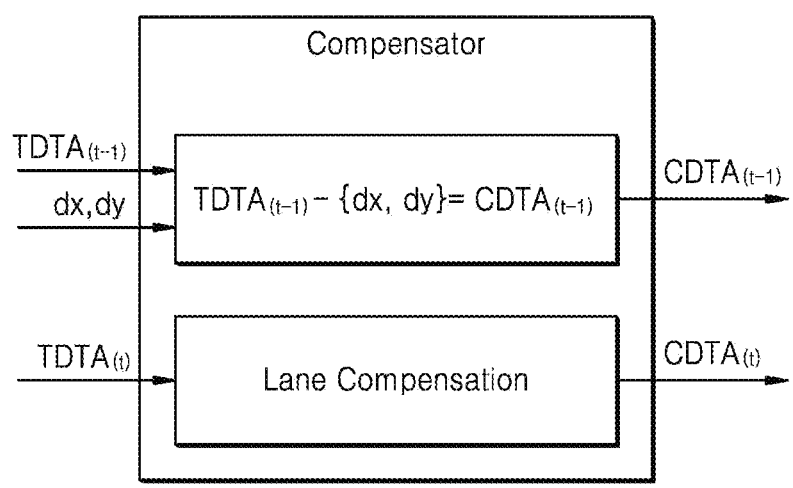
FIG. 7 is a block diagram of a compensator included in a processor, according to some example embodiments.

FIG. 7 is a block diagram of a compensator 140 included in and/or implemented by a processor (e.g., processing circuitry as described herein), according to some example embodiments. FIG. 7 will be described with reference to FIGS. 1, 2, and 4, and repeated descriptions thereof will be omitted.

The compensator 140 may receive a top-view image $TDTA_{(t-1)}$ obtained at a point in time (t−1), a top-view image $TDTA_{(t)}$ obtained at a point in time t, a horizontal change value dy, and a vertical change value dx and generate a compensated image $CDTA_{(t-1)}$ obtained at the point in time (t−1) and a compensated image $CDTA_{(t)}$ obtained at the point in time t.

The compensator 140 may perform a lane compensation operation for compensating respective lanes to be parallel to each other based on the top-view image $TDTA_{(t)}$ obtained at the point in time t. In some example embodiments, the compensator 140 may perform a movement compensation operation for removing movement elements of a vehicle by compensating (e.g., eliminating) the horizontal change value dy and the vertical change value dx in the top-view image $TDTA_{(t-1)}$ obtained at the point in time (t−1). By performing the lane compensation operation and the movement compensation operation on the top-view image TDTA, as described above, a compensated image CDTA may be an image from which vehicle shaking caused by friction between a road surface and the vehicle is removed or may be an image from which a variation caused by the movement of the vehicle is removed.

In other words, the compensator 140 may perform the lane compensation operation on the top-view image $TDTA_{(t)}$ obtained at the point in time t. Simultaneously, the compensator 140 may load the top-view image $TDTA_{(t-1)}$, which is obtained at the point in time (t−1), from the memory 170 and perform the movement compensation operation on the top-view image $TDTA_{(t-1)}$ by removing the horizontal and vertical change values dy and dx. Restated, the compensator 140 may remove the change value from an n-th frame of the top-view image loaded in the memory (e.g., $TDTA_{(t-1)}$) and may compensate a plurality of lanes to be parallel to each other, and the plurality of lanes may be detected by the compensator 140 from an (n+1)-th frame of the top-view image (e.g., $TDTA_{(t)}$) where n is a natural number (e.g., any positive integer).

Figure 8:
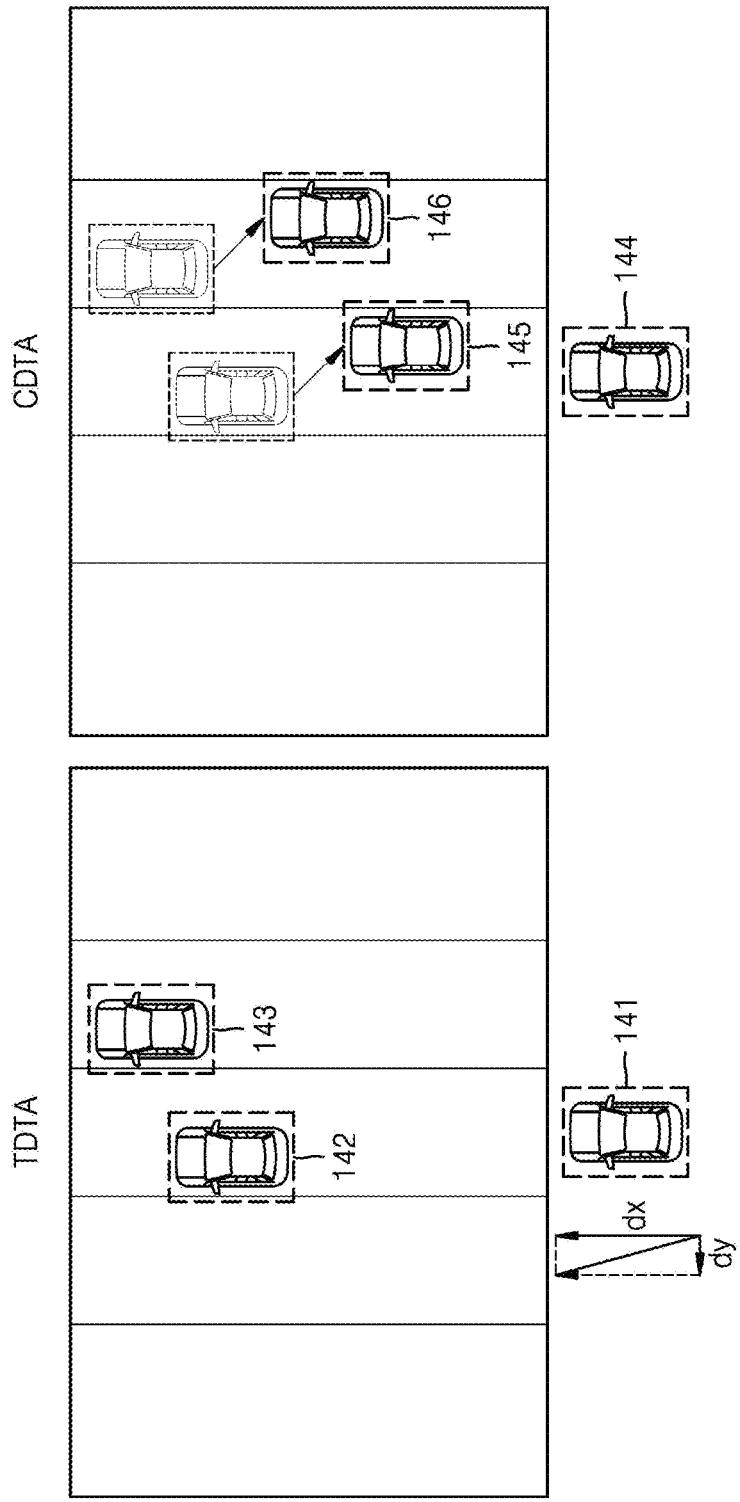
FIG. 8 is a diagram of a driving image illustrating an operation of a compensator, according to some example embodiments.

FIG. 8 is a diagram of a driving image illustrating an operation of a compensator, according to some example embodiments. FIG. 8 will be described with reference to FIGS. 4 and 7.

In a top-view image TDTA, a vehicle 142 and a vehicle 143 may be detected in front of a vehicle 141 including a processor 10. In some example embodiments, the vehicle 141 may be a vehicle that observes surrounding conditions and detects objects. Between a present point in time (t−1) and a next point in time t at which a next top-view image TDTA is captured, a steering angle STR of the vehicle 141 may be turned left, and a vehicle speed SPD may be increased. As a result, the movement extractor 130 may calculate a horizontal change value dy and a vertical change value dx by which the vehicle 141 is moved leftward and upward, respectively, in the top-view image TDTA.

In a compensated image CDTA, which is obtained by compensating the top-view image TDTA, a vehicle 145 and a vehicle 146 may be observed in front of a vehicle 144 by removing the horizontal change value dy and the vertical change value dx. Thus, the vehicle 145 and the vehicle 146 may be moved to the bottom right and observed.

Although the lanes are illustrated as being parallel to each other in FIG. 8 for brevity, a lane compensation operation may be performed on an actual driving image IDTA.

Figure 9:
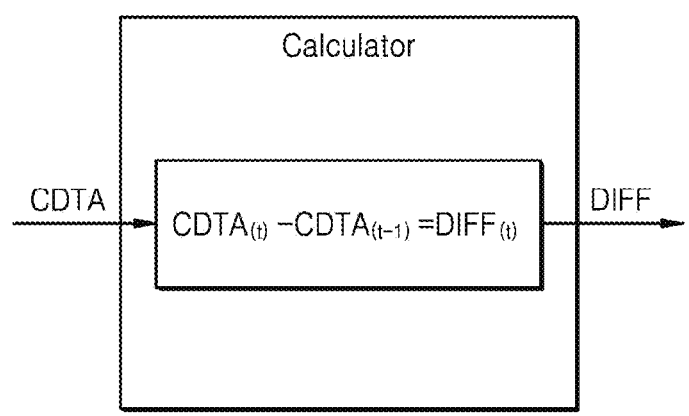
FIG. 9 is a block diagram of a calculator included in a processor, according to some example embodiments.

FIG. 9 is a block diagram of a calculator 150 included in and/or implemented by a processor (e.g., processing circuitry as described herein), according to some example embodiments. FIG. 9 will be described with reference to FIGS. 2, 4, and 7, and repeated descriptions thereof will be omitted.

The calculator 150 may perform an operation on adjacent frames of a compensated image CDTA and generate a difference image DIFF. In some example embodiments, the calculator 150 may perform a subtraction operation on a compensated image $CDTA_{(t)}$ of a frame obtained at a point in time t and a compensated image $CDTA_{(t-1)}$ of a frame obtained at a point in time (t−1) and generate a difference image $DIFF_{(t)}$. For example, when a driving image IDTA is captured at a speed of about 60 fps, the difference image $DIFF_{(t)}$ may be an image obtained by detecting a variation in the compensated image CDTA for 1/60 seconds. FIG. 9 illustrates an example in which the compensated image $CDTA_{(t-1)}$ obtained at the point in time (t−1) is subtracted from the compensated image $CDTA_{(t)}$ obtained at the point in time t. However, the inventive concepts are not limited thereto, and the compensated image CDTA(t) obtained at the point in time t may be subtracted from the compensated image CDTA(t−1) obtained at the point in time (t−1).

Figure 10:
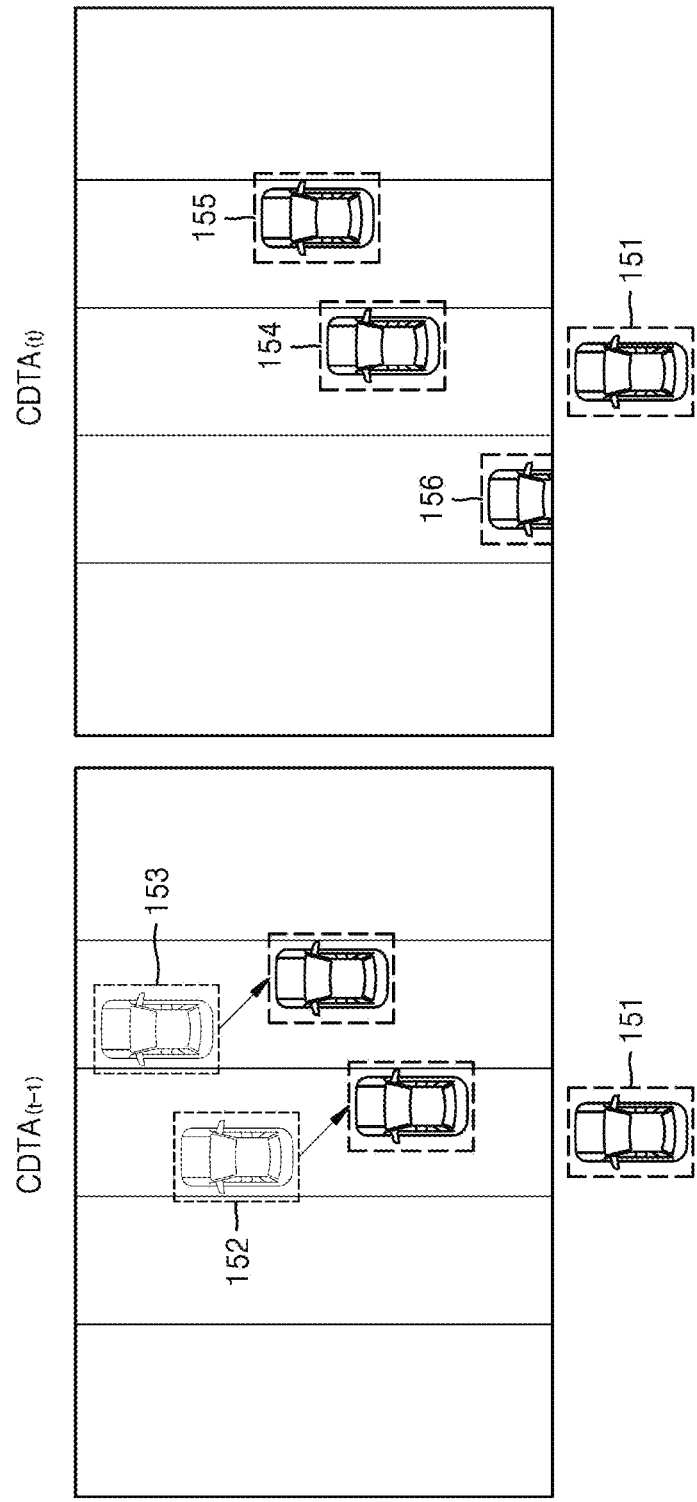
FIGS. 10 and 11 are diagrams of driving images illustrating operations of a calculator, according to some example embodiments.
Figure 11:
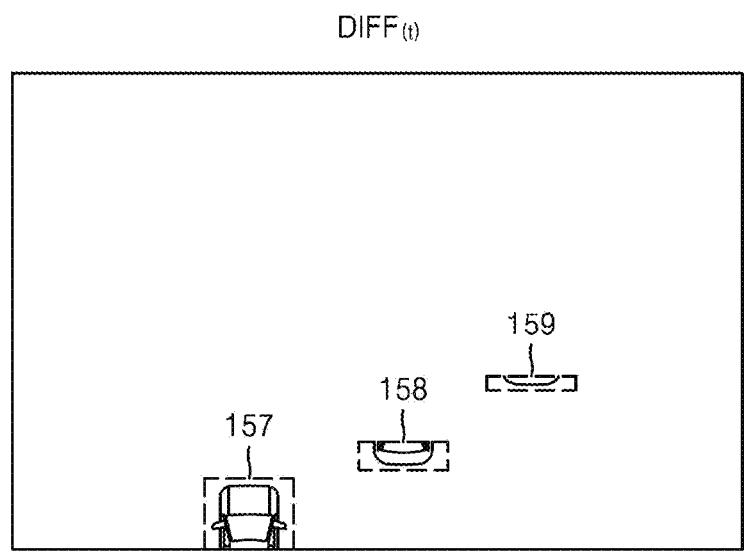

FIGS. 10 and 11 are diagrams of driving images illustrating operations of a calculator, according to some example embodiments. FIGS. 10 and 11 will be described with reference to FIGS. 2, 4, 7, and 9, and repeated descriptions thereof will be omitted.

FIG. 10 illustrates a compensated image $CDTA_{(t)}$ obtained at a point in time t and a compensated image $CDTA_{(t-1)}$ obtained at a point in time (t−1). According to the compensated image $CDTA_{(t-1)}$ obtained at the point in time (t−1), a vehicle 152 and a vehicle 153 may be observed in front of a vehicle 151 including a processor 10 configured to detect objects. Assuming that the vehicle 151 is accelerated and a steering wheel is turned left between the point in time (t−1) and the point in time t, as a result of removal of a vertical change value dx and a horizontal change value dy, each of the vehicle 152 and the vehicle 153 may be moved parallel to the right rear as indicated by arrows of a left diagram of FIG. 10. According to the compensated image $CDTA_{(t)}$ obtained at the point in time t, as a result of the acceleration of the vehicle 151 between the points in time (t−1) and t and left rotation of the steering wheel, a vehicle 154 and a vehicle 155, which are in front of the vehicle 151, may be moved to the right rear. In addition, a new vehicle 156 that was not visible at the point in time (t−1) may be additionally observed.

Referring to FIG. 11, the calculator 150 may perform an operation of subtracting the compensated image CDTA(t−1) obtained at the point in time (t−1) is subtracted from the compensated image CDTA(t) obtained at the point in time t, and a region where a relative velocity of the vehicle 151 and neighboring vehicles (157, 158, and 159) occurs may be shown. For example, when a driving image IDTA is captured at a speed of about 60 fps, a difference image DIFF(t) may show a variation in relative velocity of the vehicle 151, which occurs in a compensated image CDTA for 1/60 seconds.

Referring to FIGS. 9 to 11, a subtraction operation may be performed on a compensated image captured for each frame. In some example embodiments, when a relative velocity of the vehicle 151 to a nearby vehicle is instantaneously zero, the difference image DIFF(t) may not be generated. Objects may be previously detected by an NPU (refer to 30 in FIG. 3) and a detected OOI is verified by a processor (refer to 10 in FIG. 3), and thus, the driving of the vehicle 151 based on the objects may not be problematic.

Figure 12:
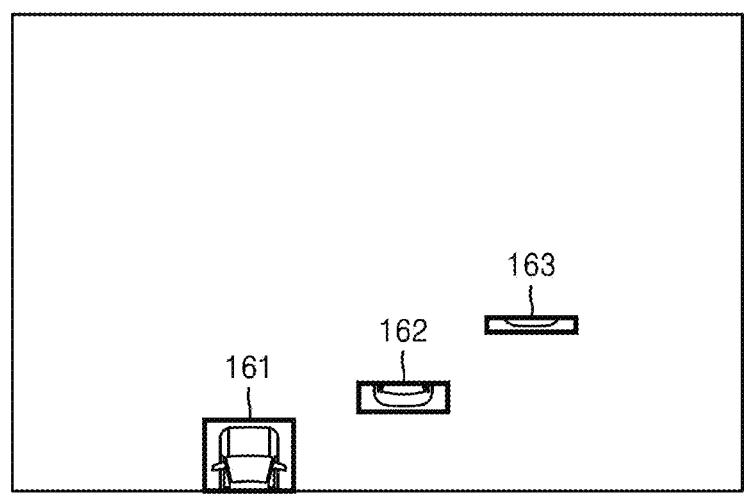
FIG. 12 is a diagram of a driving image illustrating an operation of a grouper included in a processor, according to some example embodiments.

FIG. 12 is a diagram of a driving image illustrating an operation of a grouper 160 included in a processor, according to some example embodiments.

The grouper 160 may group pixel values into at least one set according to a degree to which pixel values detected from the difference image DIFF are distributed, and the grouped pixel values may refer to a change of an object. In some example embodiments, in the image, pixels located a short distance from each other or pixels that are determined to be similar or related to each other may be grouped. Referring to FIG. 12, the pixels located a relatively short distance from each other may be grouped, and thus, the grouper 160 may detect (e.g., extract) a grouped object 161, a grouped object 162, and a grouped object 163 from the difference image DIFF. Accordingly, the grouper 160 may group one or more difference images DIFF and extract one or more grouped objects 161 to 163. Although the grouped objects 161 to 163 do not represent a complete shape of the object, each of the grouped objects 161 to 163 may refer to an amount of the change in the object for a time period corresponding to a reciprocal of a photographing speed. Accordingly, according to relative velocity analysis by which a vehicle may be interpreted as relatively stationary, an object that changes at a relative velocity around the vehicle may be detected from the difference image DIFF, and the presence of a relative change may be detected by the grouper 160.

Figure 13:
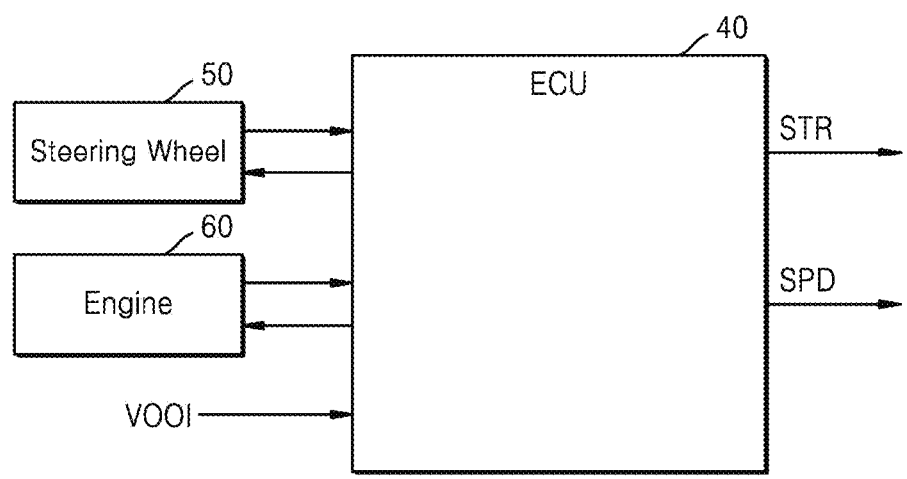
FIG. 13 is a block diagram of an electronic control device according to some example embodiments.

FIG. 13 is a block diagram of an electronic control device according to some example embodiments. FIG. 13 will be described with reference to FIGS. 2 and 3, and repeated descriptions thereof will be omitted.

The ECU 40 may wholly or partially control an operation of a vehicle and communicate with an engine and a steering wheel through a CAN multiplexing bus. The ECU 40 may generate information about a steering angle STR. The steering angle STR may refer to an angle at which a steering wheel is turned at a linear driving position of a vehicle, based on a rotation angle of the steering wheel 50 or the rotation of a wheel.

The ECU 40 may measure a vehicle speed based on at least one of an engine rotation speed (e.g., Rotation Per Minutes), a wheel speed measured by a wheel sensor, or the pedaling of a driver. The ECU may include a speed checking unit may generate information about a vehicle speed SPD, which refers to an actual speed of the vehicle.

The ECU 40 may receive a verification signal VOOI for a previous frame and adjust the vehicle speed SPD and the steering angle STR according to a distance from an OOI (e.g., a nearby vehicle). For instance, the ECU 40 may transmit a signal for maintaining speed of the vehicle or decelerating the vehicle to the engine 60 to prevent collision with a front vehicle. In some example embodiments, the ECU 40 may transmit a signal to the steering wheel 50 to perform an evasive maneuver for avoiding a collision with the front vehicle. Accordingly, the driving of a vehicle that includes the processor 10 may be enabled and/or may be improved (e.g., the vehicle may drive along a particular trajectory through the surrounding environment according to a predetermined driving plan with improved avoidance of objects in the surrounding environments, including nearby vehicles) based on detection of one or more objects (e.g., OOI) in the surrounding environment based on implementing some or all of any functions of any portions of any electronic devices (e.g., processor 10) according to some example embodiments of the inventive concepts.

Figure 14:
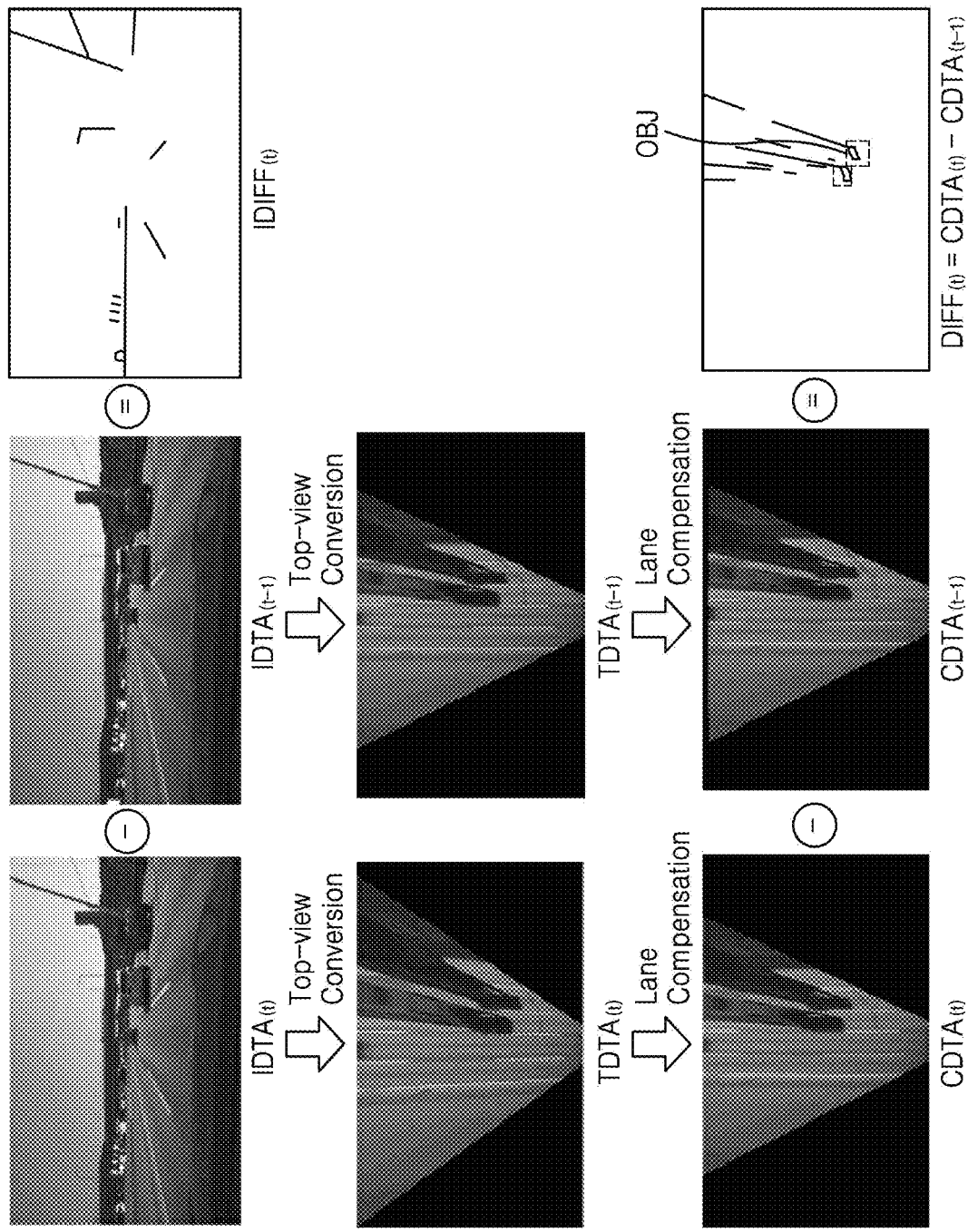
FIG. 14 is a diagram of a driving image, a converted image, a compensated image, and a difference image, which are processed by a processor, according to some example embodiments.

FIG. 14 is a diagram of a driving image, a converted image, a compensated image, and a difference image, which are processed by a processor, according to some example embodiments. FIG. 14 will be described with reference to FIGS. 2, 3, 4, and 7, and repeated descriptions thereof will be omitted.

Driving images $IDTA_{(t-1)}$ and $IDTA_{(t)}$ may be respectively generated at points in time (t−1) and t of an image sensor (refer to 20 in FIG. 3). By subtracting the driving image $IDTA_{(t-1)}$ of a frame obtained at the point in time (t−1) from the driving image $IDTA_{(t)}$ of a frame obtained at the point in time t, a driving difference image $IDIFF_{(t)}$ may be generated. Because all changes in the surrounding environment, which are caused by the movement of a vehicle, are detected in the driving difference image $IDIFF_{(t)}$, information about a relationship between the vehicle and a nearby vehicle may be relatively distorted.

According to the processing device 4 of FIG. 3 or the processor 10 of FIG. 4, a top-view image TDTA, which is obtained by converting a driving image IDTA, and a compensated image CDTA, which is obtained by compensating the top-view image TDTA, may be generated. By subtracting a compensated image $CDTA_{(t-1)}$ of a frame obtained at a point in time (t−1) from a compensated image $CDTA_{(t)}$ of a frame obtained at a point in time t, a difference image $DIFF_{(t)}$ may be generated. As compared to the driving difference image $IDIFF_{(t)}$, information about a relationship between a vehicle and a nearby vehicle may be emphasized in the difference image $DIFF_{(t)}$. Thus, the processor 10 may extract a region where a relative velocity between the vehicle and the nearby vehicle occurs.

Figure 15:
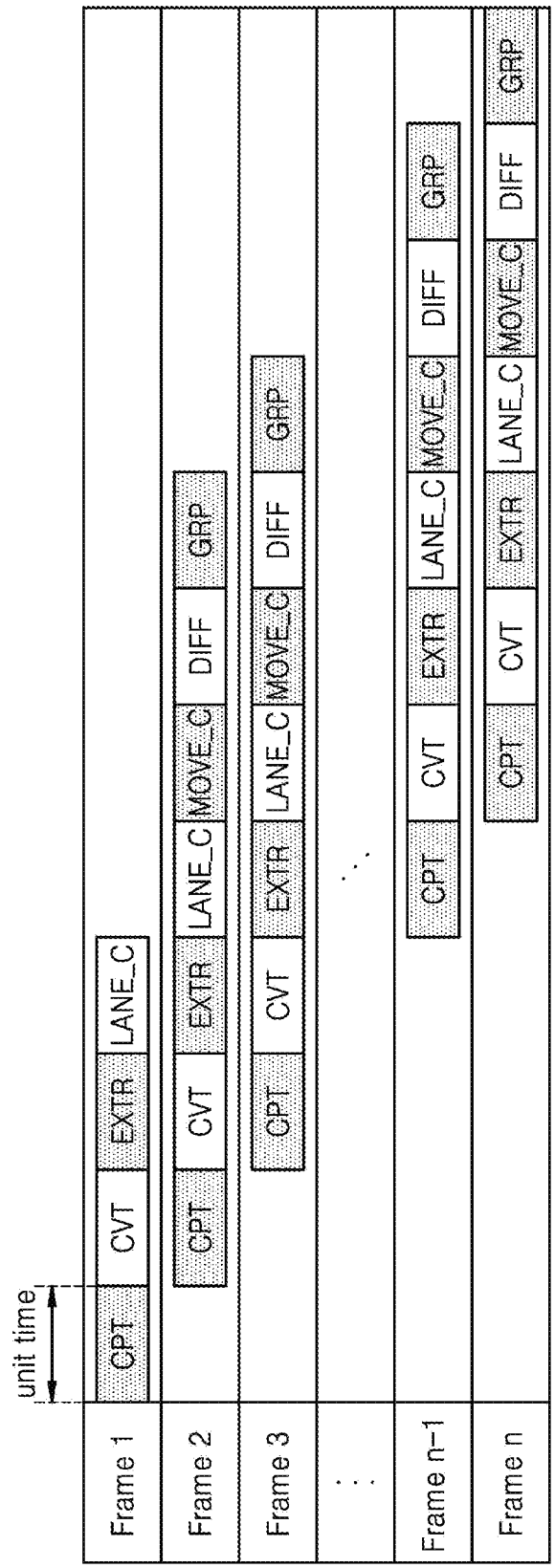
FIG. 15 is a pipeline diagram of operations processed by a processor, according to some example embodiments.

FIG. 15 is a pipeline diagram of operations processed by a processor, according to some example embodiments. FIG. 15 will be described with reference to FIGS. 2, 4, and 7, and repeated descriptions thereof will be omitted.

In a first frame, an image sensor (refer to 2100a in FIG. 2) may perform a driving image capturing operation CPT, the top-view converter 110 may perform a top-view conversion operation CVT, the movement extractor 130 may perform a movement extraction operation EXTR, and the compensator 140 may perform a lane compensation operation LANE_C.

In a second frame, the image sensor 2100a may perform a capturing operation CPT on a driving image, the top-view converter 110 may perform a top-view conversion operation CVT, the movement extractor 130 may perform a movement extraction operation EXTR, the compensator 140 may perform a lane compensation operation LANE_C, and further, perform a movement compensation operation MOVE_C. The calculator 150 may subtract a compensated image CDTA(1) obtained by performing the lane compensation operation LANE_C and the movement compensation operation MOVE_C on the first frame from a compensated image CDTA(2) obtained by performing the lane compensation operation LANE_C on the second frame and generate a difference image DIFF. A grouping operation GRP may be performed on adjacent pixels of the difference image DIFF.

In a third frame, the image sensor 2100a may perform a capturing operation CPT on a driving image, the top-view converter 110 may perform a top-view conversion operation CVT, the movement extractor 130 may perform a movement extraction operation EXTR, the compensator 140 may perform a lane compensation operation LANE_C, and further, perform a movement compensation operation MOVE_C. The calculator 150 may subtract the compensated image CDTA(2) obtained by performing the lane compensation operation LANE_C and the movement compensation operation MOVE_C on the third frame from a compensated image CDTA(3) obtained by performing a lane compensation operation LANE_C on the third frame and generate a difference image DIFF. Similarly, a grouping operation GRP may be performed on adjacent pixels of the difference image DIFF.

In the same manner as described above, the capturing operation CPT, the top-view conversion operation CVT, the movement extraction operation EXTR, the lane compensation operation LANE_C, the movement compensation operation MOVE_C, the subtraction operation DIFF, and the grouping operation GRP on a plurality of frames may be sequentially pipelined.

In FIG. 15, the capturing operation CPT, the top-view conversion operation CVT, the movement extraction operation EXTR, the lane compensation operation LANE_C, the movement compensation operation MOVE_C, the operation of generating a difference image DIFF, and the grouping operation GRP are all expressed in unit time and illustrated as being performed for the same unit time for brevity, but each operation may be performed for a different time. In FIG. 15, the abscissa denotes an operation sequence. In some example embodiments, the processor 10 may perform a different operation for each frame.

Figure 16:
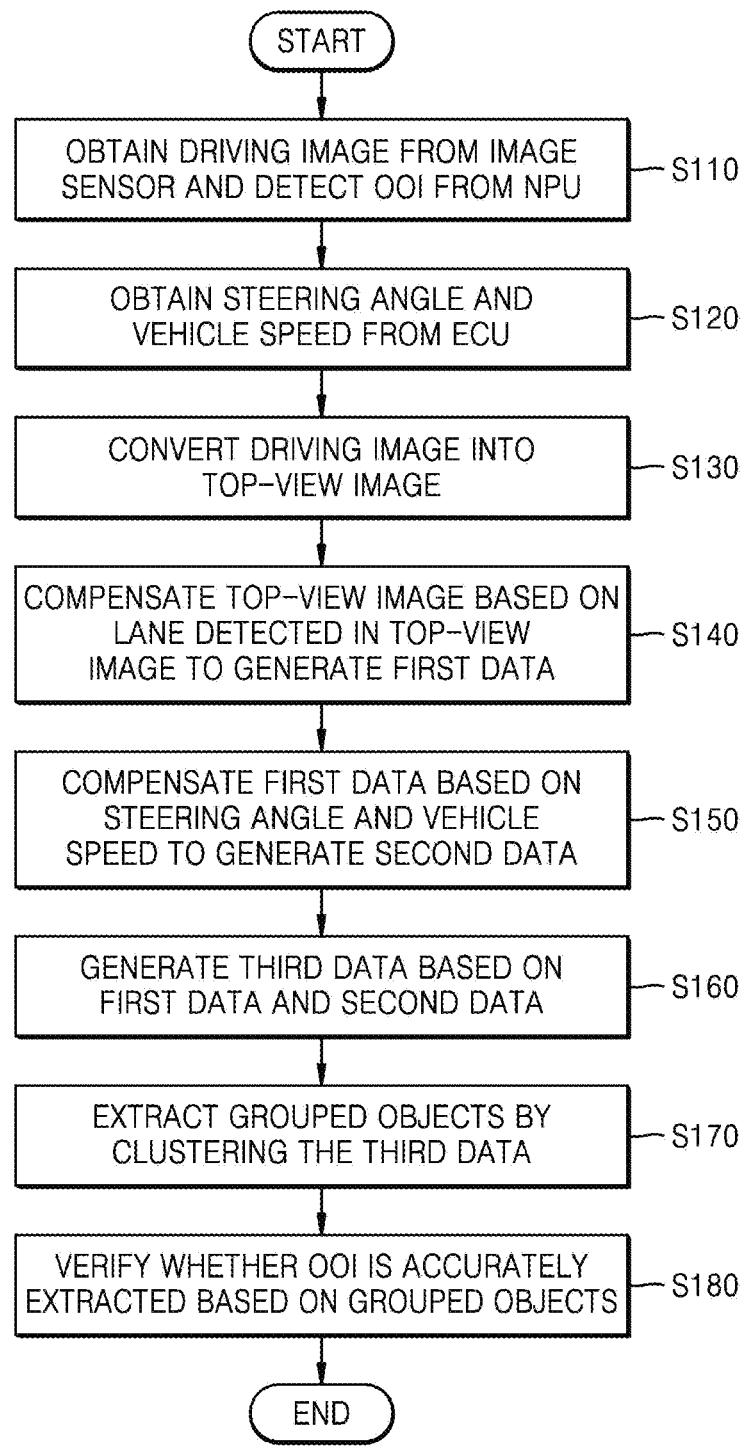
FIG. 16 is a flowchart illustrating a method of operating a processor configured to detect objects, according to some example embodiments.

FIG. 16 is a flowchart illustrating a method of operating a processor (refer to 10 in FIG. 3) configured to detect objects, according to some example embodiments. While the method is described below with regard to processor 10, it will be understood that some or all of the method may be implemented by any of the example embodiments of electronic devices as described herein according to any example embodiments. FIG. 16 will be described with reference to FIGS. 2, 3, 4, and 7. It will be understood that the operations shown in FIGS. 16-19 may be implemented in different orders than illustrated, and one or more operations may be omitted from the flowchart of operations shown in FIGS. 16-19.

Referring to FIG. 16, the processor 10 and/or electronic device according to any example embodiments may detect a driving image IDTA from the image sensor 20 and detect an OOI from an NPU (refer to 30 in FIG. 3) (S110). Such detection may include continuously obtaining a driving image. In some example embodiments, the processor 10 and/or electronic device according to any example embodiments may obtain a steering angle STR and a vehicle speed SPD from the ECU 40 (S120). Thereafter, the processor 10 and/or electronic device according to any example embodiments may convert the detected and/or continuously obtained driving image IDTA into a top-view image TDTA (S130). The compensator 140 of the processor 10 and/or electronic device according to any example embodiments may perform a lane compensation operation for compensating lanes, which are detected in the top-view image TDTA, in parallel and remove a vehicle shaking element from the top-view image TDTA. As a result, the compensator 140 of the processor 10 may generate a lane compensated image (S140). In some example embodiments, the lane compensated image may be referred to as first data. Subsequently, the compensator 140 may perform a movement compensation operation on the lane compensated image (or the first data) based on the steering angle STR and the vehicle speed SPD, and thus, a relative velocity of a vehicle with respect to a neighboring vehicle may be zero (0). As a result, a compensated image CDTA may be generated, for example based on a change value. The compensated image CDTA may be referred to as second data. A variation in a nearby vehicle observed around the vehicle may be detected by compensating the compensated image CDTA (or the second data) (S150).

Based on performing a subtraction operation on respective frames (e.g., a first frame and a second frame) of the compensated image CDTA (second data), a difference image DIFF may be generated (S160). For example, the different image DIFF may be generated based on performing a subtraction operation on the second data about an n-th frame and the first data about an (n+1)-th frame, wherein n is a natural number (e.g., any positive integer). The difference image DIFF may be referred to as third data.

The processor 10 and/or electronic device according to any example embodiments may extract grouped objects OBJ (e.g., 161) by clustering the third data (e.g., the difference image DIFF) (S170). In some example embodiments, the processor 10 may verify whether the OOI detected by the NPU 30 is accurately extracted (S180). Such operation (S180) may include the grouper 160 grouping the third data and extracting one or more grouped objects.

Figure 17:
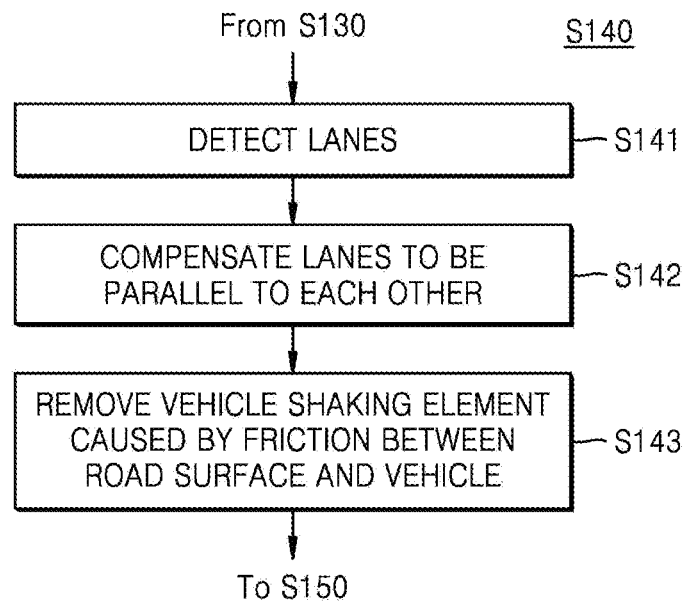
FIGS. 17, 18, and 19 are flowcharts illustrating a method of operating processors configured to detect objects, according to some example embodiments.
Figure 18:
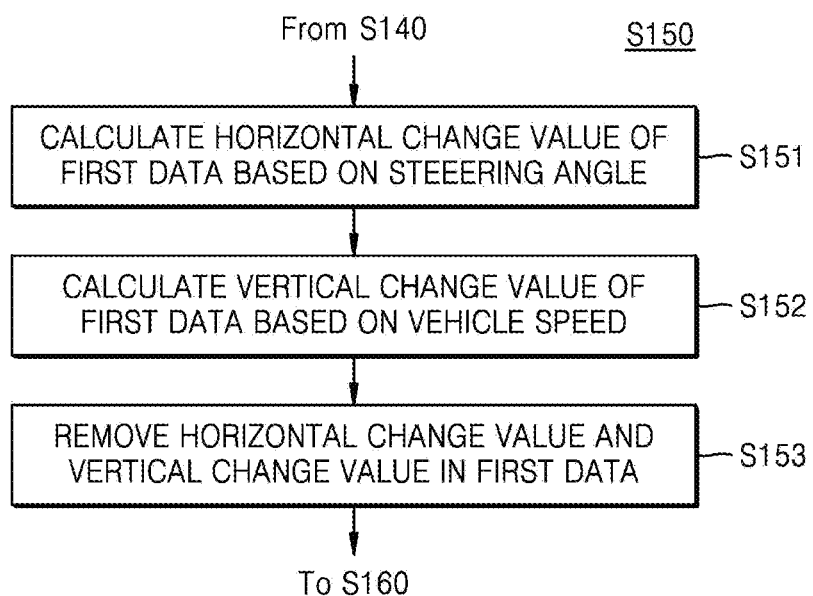
Figure 19:
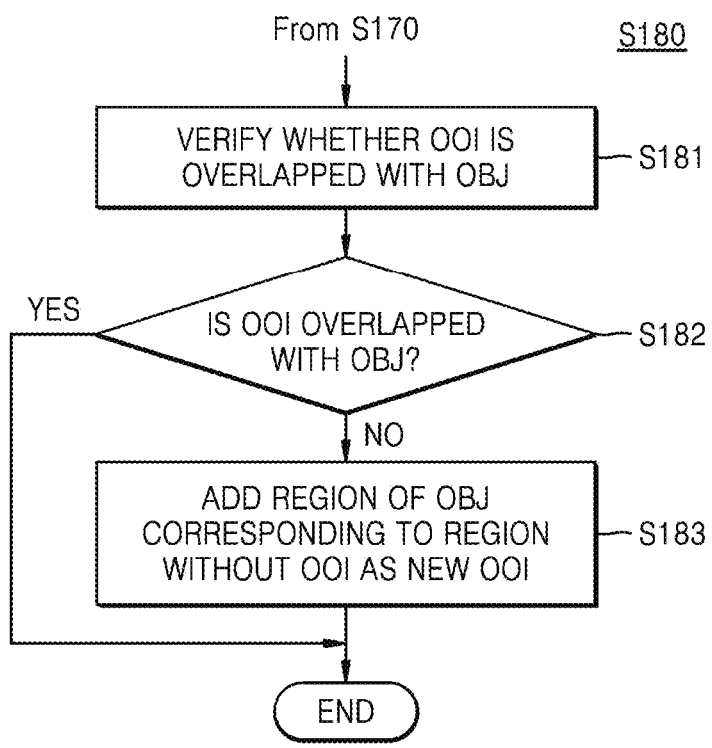

FIGS. 17, 18, and 19 are flowcharts illustrating a method of operating processors configured to detect objects, according to some example embodiments. FIGS. 17, 18, and 19 will be described with reference to FIGS. 2, 3, 4, and 7.

FIG. 17 is a detailed flowchart of a lane compensation operation (e.g., S140) according to some example embodiments. Said operation may be implemented by any of the example embodiments of electronic devices as described herein according to any example embodiments. After a driving image IDTA is converted into a top-view image TDTA (From S130), the processor 10 may detect lanes in the top-view image TDTA (S141). The processor 10 may detect a plurality of lanes in the top-view image TDTA and compensate the lanes to be parallel to each other (S142). As a result, a lane compensated image may be generated, and a lane compensated image (or first data) may be an image from which vehicle shaking caused by friction between a road surface and a vehicle is removed (S143). Thereafter, second data may be generated (To S150).

FIG. 18 is a detailed flowchart of a movement compensation operation (e.g., S150) according to some example embodiments. Said operation may be implemented by any of the example embodiments of electronic devices as described herein according to any example embodiments. After a lane compensated image is generated (From S140), the movement extractor 130 of the processor 10 and/or electronic device according to any example embodiments may calculate a horizontal change value dy of the lane compensated image based on a steering angle STR (S151), and calculate a vertical change value dx based on a vehicle speed SPD (S152), and the movement extractor 130 may generate a change value that includes the horizontal change value dy and the vertical change value dx. The compensator 140 of the processor 10 may remove the horizontal change value dy and the vertical change value dx, which are calculated, from the lane compensated image (e.g., the first data) (S153) (the movement compensation operation). As a result of removal, a compensated image CDTA (e.g., second data) may be generated based on compensating the first data (e.g., lane compensated image) based on the change value. The movement compensation operation may be sensitive to a variation in relative velocity of a nearby vehicle because a relative velocity of a vehicle may be set to 0. Thereafter, third data may be generated (To S150).

FIG. 19 is a detailed flowchart of an operation of verifying an OOI (e.g., S180), according to some example embodiments. Said operation may be implemented by any of the example embodiments of electronic devices as described herein according to any example embodiments. After the grouped objects OBJ are generated (From S170), it may be ascertained whether an OOI extracted by the NPU 30 is overlapped with objects that are detected and grouped by the processor 10 (e.g., grouped objects) and/or whether one or more grouped objects are overlapped with the OOI (S181). If the OOI extracted by the NPU 30 is overlapped with the objects detected by the processor 10 (e.g., the grouped objects) and/or a grouped object is overlapped with the OOI (S182), an additional operation of enrolling or removing an OOI to or from a list of OOIs may be responsively performed. Otherwise, if the OOI extracted by the NPU 30 is not overlapped with the objects detected by the processor 10, an extracted region corresponding to a region without the OOI may be registered as a new OOI candidate (S183), for example a grouped object may be added as a new OOI in response to the grouped object being determined to not be overlapped with the OOI.

In some example embodiments, where the method shown in FIG. 16 is at least partially performed by at least a portion of a vehicle 2, the method shown in FIG. 16 may further include adjusting at least one of the vehicle speed or the steering angle, thereby adjusting the driving of vehicle 2 in response to the verification signal VOOI. As a result, driving performance of the vehicle 2 may be controlled and/or improved based on performing at least some of the method shown in FIG. 16.

While the inventive concepts have been particularly shown and described with reference to some example embodiments thereof, it will be understood that various changes in form and details may be made therein without departing from the spirit and scope of the following claims.

What is claimed is:

1. An electronic device, comprising:
   processing circuitry configured to
      continuously obtain a driving image and convert the driving image into a top-view image,
      generate a change value including a horizontal change value based on a steering angle and a vertical change value based on a vehicle speed,
      compensate the top-view image based on a plurality of lanes to generate first data and compensate the first data based on the change value to generate second data,
      generate third data based on performing a subtraction operation on a first frame of the second data and a second frame of the second data, and
      group the third data and extract a grouped object.

2. The electronic device of claim 1, wherein the processing circuitry is configured to generate the first data based on compensating the plurality of lanes to be parallel to each other in the top-view image.

3. The electronic device of claim 2, wherein the processing circuitry is configured to generate the second data based on removing the horizontal change value and the vertical change value from the first data.

4. The electronic device of claim 1, further comprising:
   a memory configured to store frames of the top-view image,
   wherein the processing circuitry is configured to remove the change value from an n-th frame of the top-view image loaded in the memory and compensates the plurality of lanes to be parallel to each other, and wherein the plurality of lanes are detected from an (n+1)-th frame of the top-view image and n is a natural number.

5. The electronic device of claim 1, wherein the processing circuitry is configured to verify an object of interest (OOI) based on comparing the OOI provided from a neural processing circuitry with the grouped object.

6. The electronic device of claim 5, wherein the OOI is extracted from a plurality of objects included in the driving image, based on a deep-learning scheme.

7. The electronic device of claim 5, wherein the processing circuitry is configured to generate a verification signal indicating whether the grouped object is included in the OOI.

8. The electronic device of claim 7, wherein, in response to the verification signal, the neural processing circuitry is configured to add the grouped object as a new OOI in response to a determination that the grouped object is not included in the OOI.

9. The electronic device of claim 1, wherein the processing circuitry is configured to group a plurality of data values included in the third data into at least one set.

10. The electronic device of claim 1, wherein
the steering angle is measured based on a movement of a steering wheel, and
the vehicle speed is measured based on at least one of a quantity of revolutions of an engine, pedaling of a driver, of a wheel speed over a particular period of elapsed time.

11. A method of detecting an object, the method comprising:
continuously obtaining a driving image and converting the driving image into a top-view image;
generating a change value including
a horizontal change value based on a steering angle, and
a vertical change value based on a vehicle speed,
generating first data based on compensating the top-view image based on a plurality of lanes detected in the top-view image;
generating second data based on compensating the first data based on the change value;
generating third data based on performing a subtraction operation on a first frame of the second data and a second frame of the second data; and
grouping the third data and extracting a grouped object.

12. The method of claim 11, wherein the generating of the first data includes
detecting the plurality of lanes in the top-view image; and
compensating the plurality of lanes to be parallel to each other.

13. The method of claim 11, wherein the generating of the second data includes
removing the horizontal change value and the vertical change value from the first data.

14. The method of claim 11, further comprising:
obtaining an object of interest (OOI) from a neural processing circuitry,
wherein the OOI is extracted from a plurality of objects included in the driving image, based on a deep-learning scheme.

15. The method of claim 14, further comprising:
generating the grouped object based on grouping a plurality of data values included in the third data into at least one set.

16. The method of claim 15, further comprising:
verifying the OOI based on the grouped object.

17. The method of claim 16, wherein the verifying of the OOI comprises:
ascertaining whether the grouped object is included in the OOI; and
generating a verification signal indicating whether the OOI is included in the third data.

18. The method of claim 17, wherein the verification signal adds the grouped object as a new OOI when the grouped object is not included in the OOI.

19. The method of claim 18, further comprising:
adjusting at least one of the vehicle speed or the steering angle in response to the verification signal.

* * * * *